(12) United States Patent
Hoshina et al.

(10) Patent No.: US 8,412,274 B2
(45) Date of Patent: Apr. 2, 2013

(54) WIRELESS BASE STATION DEVICE

(75) Inventors: Koya Hoshina, Tokyo (JP); Yukinao Kimoto, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1362 days.

(21) Appl. No.: 11/806,707

(22) Filed: Jun. 4, 2007

(65) Prior Publication Data

US 2007/0287501 A1 Dec. 13, 2007

(30) Foreign Application Priority Data

Jun. 8, 2006 (JP) .................................. 2006-160114
Jul. 10, 2006 (JP) .................................. 2006-188861

(51) Int. Cl.
*H04M 1/00* (2006.01)

(52) U.S. Cl. ...................... 455/562.1; 370/311; 370/375

(58) Field of Classification Search .................. 455/561, 455/524, 447, 450, 562.1; 370/335, 342, 370/133, 261, 318; 375/E1.021, E1.023, 375/149, 143

See application file for complete search history.

(56) References Cited

U.S. PATENT DOCUMENTS

| | | | | |
|---|---|---|---|---|
| 5,781,583 A * | 7/1998 | Bruckert et al. | ............... | 375/146 |
| 5,790,596 A * | 8/1998 | Sexton | ........................... | 375/228 |
| 5,878,038 A * | 3/1999 | Willey | .......................... | 370/335 |
| 6,128,288 A * | 10/2000 | Miya | ............................. | 370/335 |
| 6,577,608 B1 * | 6/2003 | Moon et al. | ..................... | 370/311 |
| 7,848,281 B2 * | 12/2010 | Bienas et al. | .................. | 370/329 |
| 2008/0070565 A1 * | 3/2008 | Maeda | ........................... | 455/424 |

FOREIGN PATENT DOCUMENTS

| | | |
|---|---|---|
| JP | 10-174151 | 6/1998 |
| JP | 10-190553 | 7/1998 |
| JP | 10-191421 | 7/1998 |
| JP | 2000-023243 | 1/2000 |
| JP | 2003-219478 | 7/2003 |
| JP | 2003-249944 | 9/2003 |
| JP | 2005-175611 | 6/2005 |
| WO | 2006/054341 | 5/2006 |

OTHER PUBLICATIONS

Office Action issued Oct. 5, 2010 in corresponding Japanese Application No. 2006-160114.

* cited by examiner

*Primary Examiner* — Mahendra Patel
(74) *Attorney, Agent, or Firm* — Bacon & Thomas, PLLC

(57) ABSTRACT

A wireless base station device includes a wireless unit for performing wireless communications with a mobile station; a reception memory unit for storing therein reception spectrum spread data as reception data; a baseband reception unit for processing and decoding the reception data stored in the reception memory unit; a common downlink channel reception unit for receiving a downlink signal of other base station devices; a frame protocol processing unit for converting a transmission channel format; a baseband transmission unit for outputting encoded data; a spread processing unit for outputting spread-modulated data to the wireless unit; and a call controller for controlling an allocation of processing resources. Parameters including a spreading code and a transmission power required for installing the wireless base station device are automatically set by operating the common downlink channel reception unit to detect notification information and signal levels of neighboring base station devices.

10 Claims, 10 Drawing Sheets

WIRELESS BASE STATION DEVICE

FIELD OF THE INVENTION

The present invention relates to a wireless base station device using, e.g., a CDMA (Code Division Multiple Access) wireless communications system.

BACKGROUND OF THE INVENTION

Conventionally, a wireless base station device using a wireless communications system of a CDMA scheme performs controls thereof as described below. In wireless base station devices of a same wireless access scheme, based on conditions such as channel capacities and transmission power levels of the respective base station devices, various kinds of area configurations are considered to be applied to a service area covered by each base station device. To be more specific, in case where a wireless base station device is installed, it is required that, by surveying specific environmental conditions of an installation place, an area configuration be set based on an arrangement design of the base station device in order to avoid interferences with other base station devices.

Specifically, the area configuration is set by, e.g., setting a carrier frequency to be used in a base station device to be installed, setting a maximum transmission power, and selecting a scramble code used for a spread modulation performed when transmitting a downlink signal assigned per each sector of the base station device. Conventionally, these parameters to be set or selected are included in base station information set per each base station device to be installed (or set per each sector thereof, if the base station device to be installed is configured with a plurality of sectors), and, at the time of area configuration, a list of the parameters suitable for the environment of the installation place is prepared to be allocated to each base station device.

In a base station device, wireless resources and a device configuration that correspond to a wireless area configuration are established to commence the operation, based on parameters (hereinafter, referred to as "base station data") stored in advance in the base station device depending on its installation place, and other parameters set by a radio network controller (RNC), that is an upper-level device of the base station device, at the time of cell setup of the base station device.

In communications between a mobile station and a base station of a wireless communications system, if, for example, a transmission is requested from the mobile station, control information is sent and received via a common channel. Thus, parameters required for an individual channel setup are shared, and, if wireless resources and channel resources of the base station device that are required for individual channel setup are acquired, the individual channel setup is carried out to thereby commence communications for user data. For this purpose, when the operation of the base station device is started, a common channel is first set up, and then a transmission power, whose level is high enough to enable communications with a wireless portable terminal device, is applied by considering an area covered by the base station device.

A baseband unit of the wireless base station device has resources for a channel used for providing a mobile station located within a cell with information on service area (cell) set with respect to the base station device as well as a common channel used for receiving a new call and transmitting control information for setting up the base station device, and other resources for an individual channel for transmitting data and control information on a one-to-one basis between the mobile station and the base station.

FIG. 4 is a block diagram showing an example of configuration of a conventional wireless base station device. The wireless base station device includes a wired transmission line interface (IF) unit 11 connected to an upper-level device (RNC); a frame protocol (FP) processor 12 for performing a frame protocol processing required for interfacing with the wired transmission line; a call controller 13 for performing a call control; a wireless unit 14 for communicating with a mobile station; a reception memory 15 for storing sampling data of uplink reception data outputted from the wireless unit 14; a baseband receiver 20 of an individual uplink channel for performing a baseband reception of the individual uplink channel based on the data stored in the reception memory 15; a baseband receiver 30 of a common uplink channel for performing a baseband reception of the common uplink channel based on the data stored in the reception memory 15; a baseband transmitter 40 of an individual downlink channel for performing an encoding and modulation on individual downlink channel data processed by the frame protocol processor 12; a baseband transmitter 50 of a common downlink channel for performing an encoding and modulation on common downlink channel data processed by the frame protocol processor 12; and a spread processor 16 for, by using a specific spreading code, spread-modulating downlink data outputted from the baseband transmitter 40 of the individual downlink channel and the baseband transmitter 50 of the common downlink channel, and then outputting the spread-modulated downlink data to the wireless unit 14.

Further, the baseband receiver 20 of the individual uplink channel includes a control channel inverse spread unit 21; a data channel inverse spread unit 22; a demodulator 23; a demodulation data memory 24; and a decoder 25.

The baseband receiver 30 of the common uplink channel includes a control channel inverse spread unit 31; a data channel inverse spread unit 32; a demodulator 33; a demodulation data memory 34; and a decoder 35.

The baseband transmitter 40 of the individual downlink channel includes an encoder 41 and a modulator 42.

The baseband transmitter 50 of the common downlink channel includes an encoder 51 and a modulator 52.

The wireless base station device configured as above is connected to an upper-level device (RNC) via the wired transmission line interface unit 11. At a start-up of the base station, firstly, the call controller 13 sets up necessary parameters of the wired transmission line from the base station data, and inputs cell setup data set by the upper-level device to the wireless unit 14 and the baseband signal processor. The parameters to be inputted to the wireless unit 14 include, e.g., a frequency number of a carrier in use. In the baseband signal processor, a parameter of a pilot channel (CPICH), which serves as a reference of the transmission power and a timing of the common downlink channel, is set up. In addition, a scramble code for spread-modulating downlink data outputted from the base station device is set up.

Hereinafter, an initial parameter setting method in a conventional wireless base station device communicating with a plurality of mobile stations (terminal devices) will be described. Recently, to cope with an increase in users of terminal devices, a method (also known as "micro cell method") of reducing a cell size per each base station device 61 has been employed as shown in the example of area configuration of FIG. 5. In FIG. 5, reference numeral 61 denotes a plurality of wireless base station devices, each of which has a micro cell area 62, surrounded by a plurality of wireless base station devices 63, each of which has a micro cell area 64.

As set forth above, in recent years, the micro cell method has been employed to cope with the increase in users of terminal devices, and cells are becoming smaller. In this case, cells tend to be easily affected by, e.g., landforms, structures such as buildings, or external interferences with neighboring cells. Especially in case of the CDMA scheme, the amount of interference power, that includes an internal interference 65 with the terminal device existing within the cell and an external interference 66 with neighboring cells, is highly dependent upon a channel capacity of the base station device. Considering this, when an area configuration is to be set by a small-scale wireless base station device, it is important to configure a base station and set parameters to be suitable for a surrounding environment of the base station.

Further, as a prior art related to the present invention, there is provided a technique for setting a communications configuration for a wireless base station (see, for example, Patent Document 1). A wireless base station device setting system disclosed therein includes a wireless base station device setting device for setting a communications configuration of a wireless base station device. When the wireless base station setting device receives a setting request notification message from the wireless base station device, the wireless base station setting device deletes information about the wireless base station device among information stored in its information storage unit, and estimates a position of the wireless base station device. Then, the wireless base station setting device reads out, from the information storage unit, a communications configuration of another wireless base station device installed in a vicinity of the estimated position, and determines a communications configuration of the wireless base station device according to the read-out communications configuration of said another wireless base station device as well as the estimated position.

In addition, as another prior art related to the present invention, there is provided a W-CDMA portable phone system having a plurality of wireless base stations and a base station controller for controlling the plurality of wireless base stations (see, for example, Patent Document 2). As disclosed therein, a wireless base station receives a radio signal from another wireless base station, and processes the received radio signal, thereby specifying a control channel of said another wireless base stations. Thereafter, the wireless base station identifies, based on the control channel, a downlink scramble code of the radio signal sent from said another wireless base station. Then, the base station controller determines, based on the identification result from the wireless base station, a downlink scramble code of the wireless base station that has sent the identification result.

In accordance with the initial parameter setting method of the conventional base station device as shown in FIG. 4, if parameters suitable for an installation place and an environment thereof are determined in advance, stored parameters, together with other parameters set by the upper-level device (RNC), are set in the wireless unit 14, the wired transmission line interface unit 11 and the baseband signal processor (not shown) to thereby start the operation.

However, if a place at which the base station device is to be installed is not specified in advance, when the operation is started by installing the base station so that a degree of freedom is given with regard to the installation place, it is difficult to prepare suitable parameters in advance. Especially in a case where a relatively small number of terminal devices are acceptable to the base station device and the base station device is small in size, if predetermined initial parameters are applied without considering the environment depending on the place to be used, there are many cases where proper operations are not possible due to the effects of, e.g., interferences in communications between the base station device and terminal devices and those between neighboring base station devices and terminal devices.

First, let us consider a scramble code to be used for a spread modulation of a downlink signal of a base station device. A terminal device first checks a scramble code number assigned to each cell, measures a reception level of a common channel to thereby select a most suitable base station device among base station devices to which the terminal device has access. However, if, for example, a scramble code number of the base station device to be installed is same as that of a neighboring base station device, an identification of cell is not possible.

In addition, a fixed transmission power is used for a pilot channel (CPICH) and a broadcast control channel from the base station device. In this case, if a set power level is not suitable for an area covered by the base station device, interferences take place to affect terminal devices that are communicating with neighboring base station devices to thereby deteriorate a communications quality.

Further, although a single frequency can be commonly used by adjacent cells in a CDMA scheme, influences of external interference can be reduced by using different frequencies for the area configuration. However, if a different frequency is arbitrarily assigned, and a target base station device to which a handover is expected cannot accept the different frequency that has been arbitrarily assigned, a forced release is carried out to thereby increase a call loss probability. Moreover, since a hard handover is used for transferring a call between cells using different frequencies, a diversity effect, that can be obtained in case of transferring a call between cells using a same frequency by a soft handover, cannot be obtained. Herein, the diversity effect refers to that channels of a current cell and another cell can be used at the same time.

Furthermore, in Patent Document 1, the wireless base station setting device estimates a position of a wireless base station device when it receives a setting request notification message from the wireless base station device, and reads out, from an information storage unit therein, a communications configuration of an existing wireless base station device placed at the vicinity of the estimated position. Then, the wireless base station setting device determines a communications configuration of the wireless base station device based on the readout communications configuration of the existing wireless base station device and the estimated position. Thus, since the wireless base station setting device disclosed in Patent Document 1 does not search neighboring base station devices for itself, it is not possible to obtain information of an actual environment in which the wireless base station device is installed.

Additionally, the wireless base station device, when it accesses to the wireless base station controller to receive information of neighboring base station therefrom, receives a downlink signal of another base station devices by using the information of the neighboring base station to thereby measure a signal level to be used for a position detection. However, since the wireless base station device is configured such that the area configuration is set by a user, it is difficult to perform an optimal area configuration in which communications overheads or interferences with other base station devices are taken into consideration.

Moreover, in Patent Document 2, the wireless base station identifies a downlink scramble code of a radio signal from other wireless base station to thereby determine a downlink scramble code of the wireless base station itself by the base station controller, but fails to consider base station information other than scramble code.

Further, in wireless communications systems, signals are communicated between a base station device (radio base station device) and a plurality of terminal devices by wireless.

Generally, in case of installing and starting up a base station device, setting data (for example, frequency and/or code data) for starting up the base station device is inputted thereto by a worker or engineer who is particularly allowable by a communication provider.

It is however expected that a system in which numerous base station devices each having a small communication area are installed will be used in the future. In this case, it is also supposed that many workers are required, which need immense installation expense. In addition, since the communication area of each base station device is small, it would be quite difficult to install a plurality of base station devices in order to prevent any leakage in such communication area.

For the reason, if a user of a base station device installs it in a desired range for its use by oneself, it is expected that the base station device could be very efficiently installed. However, it is problematic that the communication provider does not usually teach setting data of the base station device to common users.

(Patent Document 1) Japanese Patent Laid-Open Application No. 2005-328152
(Patent Document 2) Japanese Patent Laid-Open Application No. 2005-219478
(Patent Document 3) Japanese Patent Laid-Open Application No. H6-261362

SUMMARY OF THE INVENTION

To solve the above problems, it is a first object of the present invention to provide a wireless base station device of a small-scale area configuration to be installed by a user as desired, which can automatically execute settings of a spreading code or a transmission power required for the installation of the base station device itself. This is implemented by, at a start-up of the device, converting a baseband signal processing into a downlink signal reception of other base station devices and finding out notification information or signal levels of neighboring base station devices of wireless access type to thereby detect installation conditions and radio wave propagation conditions of the neighboring base station devices that are dependent on the installation place of the wireless base station device.

In accordance with a first aspect of the present invention, there is provided A wireless base station device, including a wireless unit for performing wireless communications with a mobile station; a reception memory unit for storing therein reception spectrum spread data per sample as reception data, wherein the reception spectrum spread data is received by the wireless unit and sequentially sampled; a baseband reception unit for processing and decoding the reception data stored in the reception memory unit; a common downlink channel reception unit, activated at a start-up of the wireless base station device, for receiving a downlink signal of other base station devices by using the reception data stored in the reception memory unit; a frame protocol processing unit including an interface for communicating with a wired transmission line for an upper-level device, for performing a frame protocol processing for the interface to convert a transmission channel format with respect to an uplink signal received by the baseband reception unit and a downlink signal transmitted from the upper-level device; a baseband transmission unit for encoding downlink data outputted from the frame protocol processing unit, and digitally modulating to output encoded data; a spread processing unit for spread-modulating the encoded data outputted from the baseband transmission unit to output spread-modulated data to the wireless unit; and a call controller for controlling an allocation of processing resources for each of the units when a new call is received by the wireless base station device, wherein parameters including a spreading code and a transmission power required for installing the wireless base station device are automatically set by operating the common downlink channel reception unit at the start-up of the wireless base station device to detect notification information and signal levels of neighboring base station devices.

In accordance with a second aspect of the present invention, there is provided A wireless base station device, including a wireless unit for performing wireless communications with a mobile station and other wireless base station devices; a reception memory unit for storing therein reception spectrum spread data per sample as reception data, wherein the reception spectrum spread data is received by the wireless unit and sequentially sampled; a baseband reception unit for processing and decoding the reception data accumulated in the reception memory unit; a frame protocol processing unit including an interface for communicating with a wired transmission line for an upper-level device, for performing a frame protocol processing for the interface to convert a transmission channel format with respect to an uplink signal received by the baseband reception unit and a downlink signal transmitted from the upper-level device; a baseband transmission unit for encoding downlink data outputted from the frame protocol processing unit, and digitally modulating to output encoded data; a spread processing unit for spread-modulating the encoded data outputted from the baseband transmission unit to output spread-modulated data to the wireless unit; and a call controller for controlling an allocation of processing resources for each of the units when a new call is received by the wireless base station device, wherein, at a start-up of the wireless base station device, at least a part of a baseband signal processing is converted into a reception process for receiving a downlink signal from other base station devices, and neighboring base station devices are searched, so that, if an effective cell detected, a transmission frequency of the wireless unit is set to be identical to a frequency of the effective cell, and a spreading code used for the spread processing unit is set to be different from that of the effective cell.

It is preferable that, in the first aspect of the present invention, by providing a wired interface function for a control signal of a modularized terminal device for communicating with the wireless base station device and setting a communications protocol control to the terminal device, a downlink signal of the neighboring base station devises is received by using the modularized terminal device to acquire installation conditions of the neighboring base station devices or propagation conditions of radio waves according to a wireless access method that are required when installing the wireless base station device, so that the notification information and the signal levels of the neighboring base station devices are detected to automatically set the spreading code and the transmission power required for installing the wireless base station device.

In accordance with the present invention, in a small-scale area configuration that allows a user to freely execute the installation of a wireless base station device, parameters inherent to the wireless base station device (e.g., a scramble code or a frequency) appropriate for the peripheral cell environment can be independently selected and set when installing the wireless base station device, by operating a downlink common channel receiver at a start-up of the device or switching over a base band signal processing into a downlink signal reception from other wireless base station device.

Further, in a wireless network as described above, since tens of wireless base station devices are arranged for an upper-level device, it is possible to reduce a load of the upper-level device, compared to a case where neighboring base station information is batch-managed in the upper-level device to thereby set up and control the base station information. Besides, since the wireless base station device has an initial cell search function same as that of the terminal device, it is possible to acquire neighboring base station information closer to an actual installation environment.

In addition, in accordance with the present invention, the system configuration can be made simple, because the setting device need not detect a neighboring base station to determine a scramble code. Moreover, in case of a home-use base station that a user can install as desired, a frequent installation change is considered. In case a centralized control as described above is performed in the upper-level device without independently selecting and setting the base station parameters, if only fixed base station(s) is/are present at the vicinity of the installed base station, neighboring base station(s) can be determined to be present at the vicinity of the installed base station; however, if neighboring base station(s) is/are also home-use base station(s), neighboring base station information may be updated frequently, which complicates the control over the upper-level device. Therefore, it can be deduced to be more efficient that the base station is configured such that necessary decisions are independently made by the base station and only notifications thereof are given to the upper-level device.

As set forth above, in case of enabling the user to install the base station device by oneself as in the prior art, there is a need for development of an improved configuration which sets up setting data to the base station device.

The present invention has been made in view of the needs or the problems as above, and it is a second object of the present invention to provide a base station device which performs a process for setting a frequency and/or code suitable for use in wireless communications when a power is ON.

To achieve the second object, the base station device of the present invention carries out wireless communications with a terminal device by the configuration as follows.

That is, a power-on means switches a power from OFF to ON. A detection means detects a radio reception status for each communications type in response to the switching of the power from OFF to ON by the power-on means. A transmission means sends information on the result of detection by the detection means to an upper-level device. A reception means receives information specifying a communications type sent from the upper-level device. A setting means sets the communications type based on the information received by the reception means. A wireless communications execution means commences wireless communications with the terminal device by using the communications type set by the setting means.

Here, for example, when the upper-level device receives the information transmitted from the transmission means of the base station device, it determines a communications type suitable for use in the base station device on the basis of the received information, and sends information specifying the determined communications type to the base station device to notify the base station device of the communications type. In other words, the reception means receives the information specifying the determined communications type sent from the upper-level device in order to notify the base station device of the determined communications information based on the received information by the upper-level device that has received it from the transmission means.

Therefore, when the power of the base station device is switched from OFF to ON by the user, the communications type appropriate for use in the wireless communications is automatically set to the base station device based on the radio waves reception situation in the base station device, and the wireless communications between the base station device and the terminal device is started. Thus, the start-up situation of the base station device can be properly used by the user or communication provider.

Here, for example, the power-on means has a switch function that is manipulated by a person (user and so on) and switches ON/OFF of the power.

Further, various types may be used as the communications type, wherein, for example, a combination of a frequency and a code or only frequency may be used.

Besides, the information on the radio reception status or its detection result may be any information as long as it can estimate the interference status between the base station devices. As one example, a level of received signal may be employed.

Further, various devices may be used as the upper-level device, wherein, for example, the base station controller arranged at the communication provider side may be used.

In addition, the upper-level device determines a communications type used by the base station device so that an interference between the base station devices is small (preferably, not generated).

Further, for example, one communications type is notified and set by the base station device as the communications type notified to the base station from the upper-level device. As another configuration example, a plurality of communications types may be notified and one of them may be set by the base station device.

Additionally, for example, the process of establishing a radio link with the terminal device or of conducting the wireless communications with the terminal device where the radio link is established is executed as the process of initiating the wireless communications with the terminal device using the set communications type.

Further, various devices may be utilized as the terminal device, wherein, for example, a mobile station device that is portable may be used. As another configuration example, a fixedly installed device may be utilized.

The base station device of the present invention is configured as one configuration example, as follows.

That is, a status receiving means receives information on the radio reception status of the terminal device, sent from the terminal device by wireless. The transmission means sends the information on the radio reception status of the terminal device received by the status reception means to the upper-level device. In response to this, the reception means receives the information specifying the communications type sent from the upper-level device, and in this case, the setting means sets the communications type depending on the information received by the reception means. The wireless communications execution means executes the wireless communications with the terminal device by using the communications type set by the setting means.

Here, the terminal device detects a radio reception status for each communications type and sends information on the result of detection to the base station device by wireless. For example, this information transmission from the terminal device is done after the wireless communications between the base station device and the terminal device is initiated.

Further, when the upper-level device receives the information on the radio reception status of the terminal device sent from the transmission means of the base station device, it determines a communications type suitable for use in the base station device based on the received information and sends information specifying the determined communications type to the base station device in order to notify the base station device of the communications type.

Therefore, for example, when the power of the base station device is switched from OFF to ON by the user, the communications type appropriate for use in the wireless communications is automatically set to the base station device based on the radio waves reception situation in the base station device, and the wireless communications between the base station device and the terminal device is started. Then, the communications type suitable for use in the wireless communications is set to the base station device based on the radio waves reception situation in the terminal device, and thus, it becomes possible to set a better communications type.

Here, any information that can be used for estimating the interference status of radio waves from a plurality of base station devices in the terminal device may be used as the information on the radio reception status or its detection result in the terminal device, wherein a level of received signal may be used as one example.

Further, in case the upper-level device determines the maintenance of the communications type currently set in the base station device, information representing the fact that there is no change of the communications type may be used as the information specifying the communications type sent from the upper-level device to the base station device, and it does not need to perform the change process of the communications type (here, the setting process of the same communications type) in the base station device.

The base station device of the present invention is configured as one configuration example, as follows.

That is, an authentication request means requests an authentication unit arranged at the upper-level side to execute an authentication process in response to the switching of the power from OFF to ON by the power-on means. An authentication result receiving means receives information on the result of authentication process sent from the authentication unit. Further, the base station device is permitted to communicate with the upper-level device only if authenticated to be legitimate by the authentication unit.

Here, the authentication unit carries out the authentication process if requested by the authentication request means of the base station device, and sends information on the result of authentication process to the base station in order to notify the base station device of the result of authentication process. In other words, the authentication result receiving means receives the information on the result of authentication process sent from the authentication unit in order to notify the corresponding base station device of the result of authentication process done by the authentication unit in response to the authentication process request from the authentication request means.

Therefore, for example, if there is not a legitimate user, the base station device cannot be normally started up although the power thereof is ON, thereby preventing the unfair use.

Here, various units may be used as the authentication unit, wherein, for example, a server of the communication provider side may be used.

Further, the authentication process that is conducted between the base station device and the authentication unit may be embodied by using a process, in which the authentication process is requested by sending authentication information such as a user name and/or password from the base station device to the authentication unit, and the authentication unit judges whether the received authentication information is legitimate or not and notifies the base station device of the result of judgment as the information on the result of authentication process.

In addition, the configuration which allows only the base station device authenticated to be legitimate to communicate with the upper-level device may be implemented by employing a configuration, in which the authentication unit notifies only the base station device authenticated to be legitimate of information of address and so on required for communications with the upper-level device as the information on the result of authentication process.

As another configuration example, it is possible to employ a configuration in which the upper-level device serves as the authentication unit and carries out authentication by using authentication information such as a user name and/or password.

As described above, according to the present invention, when the power of the base station device is switched from OFF to ON, the communications type suitable for wireless communications is automatically set to the base station device and wireless communications between the base station device and the terminal device is initiated. Therefore, the start-up situation of the base station device can be properly used by the user or communication provider.

BRIEF DESCRIPTION OF THE DRAWINGS

The above and other objects and features of the present invention will become apparent from the following description of embodiments, given in conjunction with the accompanying drawings, in which.

Figure 1:
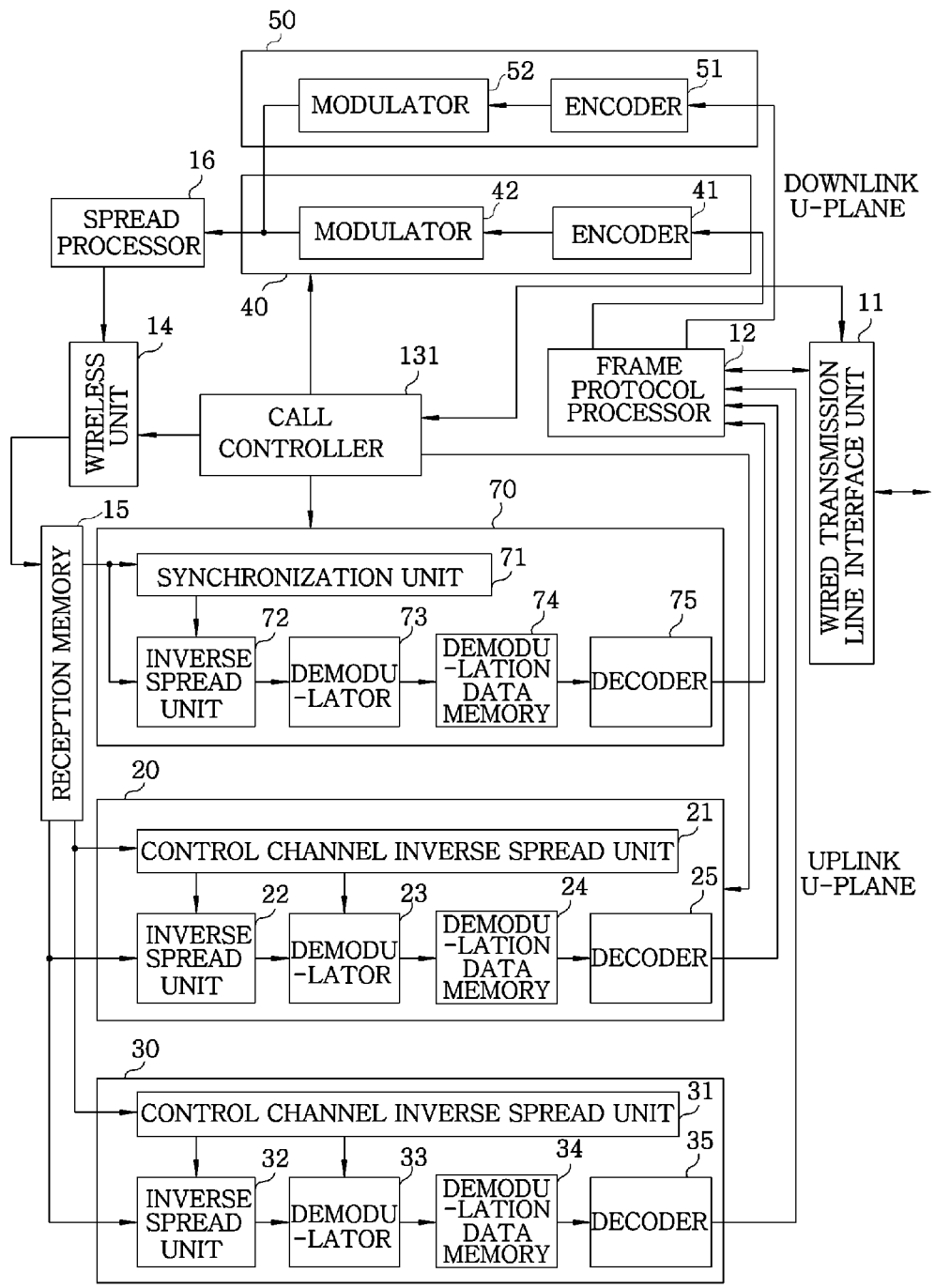
FIG. 1 shows a block diagram illustrating an exemplary configuration of a wireless base station device in accordance with a first embodiment of the invention.

DETAILED DESCRIPTION OF THE EMBODIMENTS (First Embodiment)

Hereinafter, a first embodiment of the present invention will be described in more detail with reference to the accompanying drawings. Hereinafter, same reference numerals are denoted for same parts as in the conventional device shown in FIG. 4.

FIG. 1 shows a block diagram illustrating an exemplary configuration of a baseband unit of a wireless base station device in accordance with a first embodiment of the present invention. The wireless base station device includes a wired transmission line interface (IF) unit 11 connected to an upper-level device (RNC); a frame protocol (FP) processor 12 for performing a frame protocol processing required for interfacing with the wired transmission line; a call controller 131 for performing a call control; a wireless unit 14 for communicating with a mobile station; a reception memory 15 for storing sampling data of uplink reception data outputted from the wireless unit 14; a baseband receiver 20 of an individual uplink channel for performing a baseband reception of an individual uplink channel based on the data stored in the reception memory 15; a baseband receiver 30 of a common uplink channel for performing a baseband reception of a common uplink channel based on the data stored in the reception memory 15; a baseband transmitter 40 of an individual downlink channel for performing an encoding and modulation on data of an individual downlink channel processed by the frame protocol processor 12; a baseband transmitter 50 of a common downlink channel for performing an encoding and modulation on data of a common downlink channel processed by the frame protocol processor 12; a spread processor 16 for spread-modulating downlink data outputted from the baseband transmitter 40 of an individual downlink channel and the baseband transmitter 50 of a common downlink channel by employing a specific spreading code and outputting the spread-modulated data to the wireless unit 14; and a common downlink channel receiver 70 that operates at a start-up of the base station device.

The call controller 131 is provided with a resource management function of, when the base station device receives a new call, controlling an allocation of processing resources of the wireless unit 14 and each of the baseband signal processors.

Figure 4:
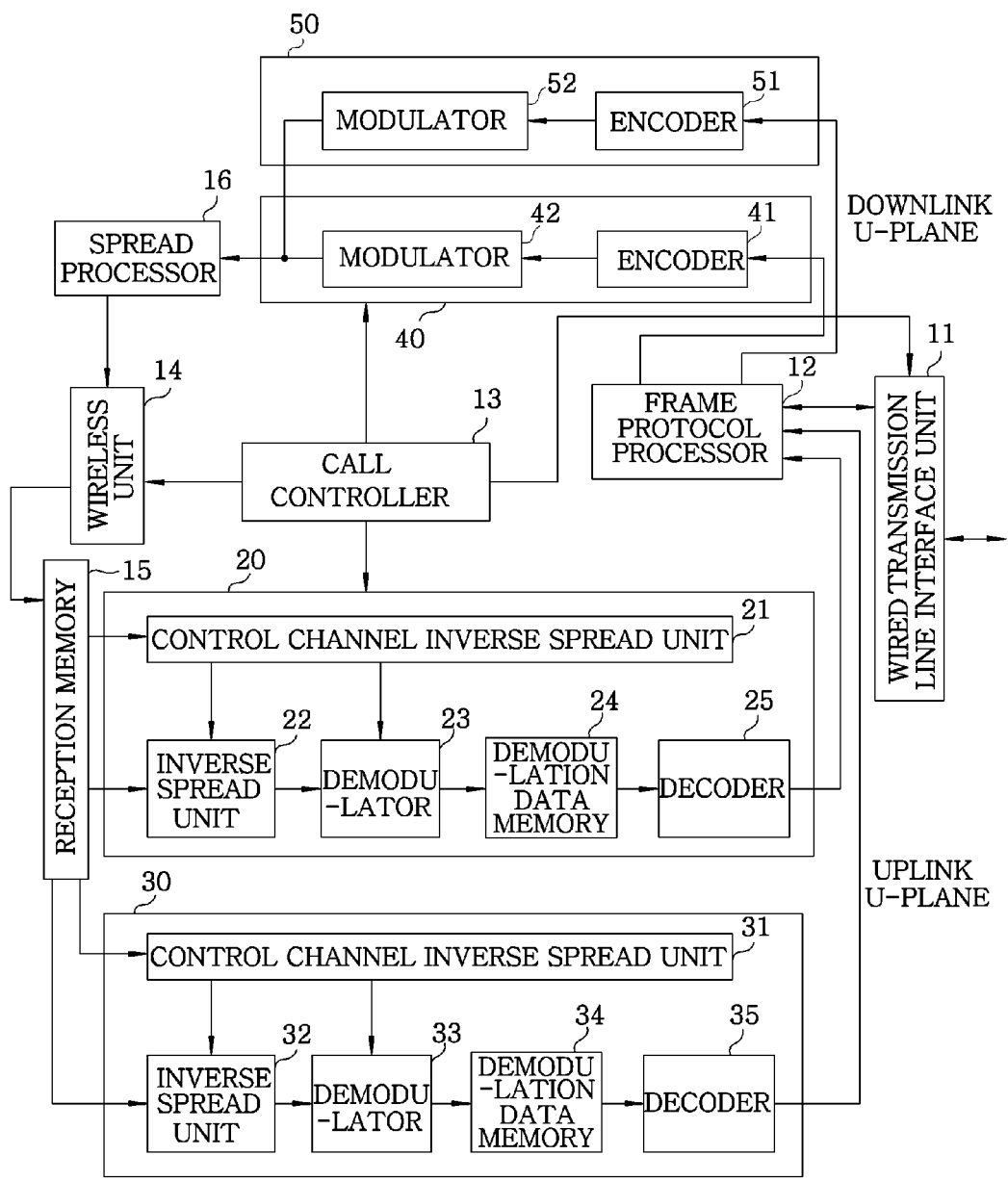
FIG. 4 depicts a block diagram showing a configuration of a conventional wireless base station device.
Figure 5:
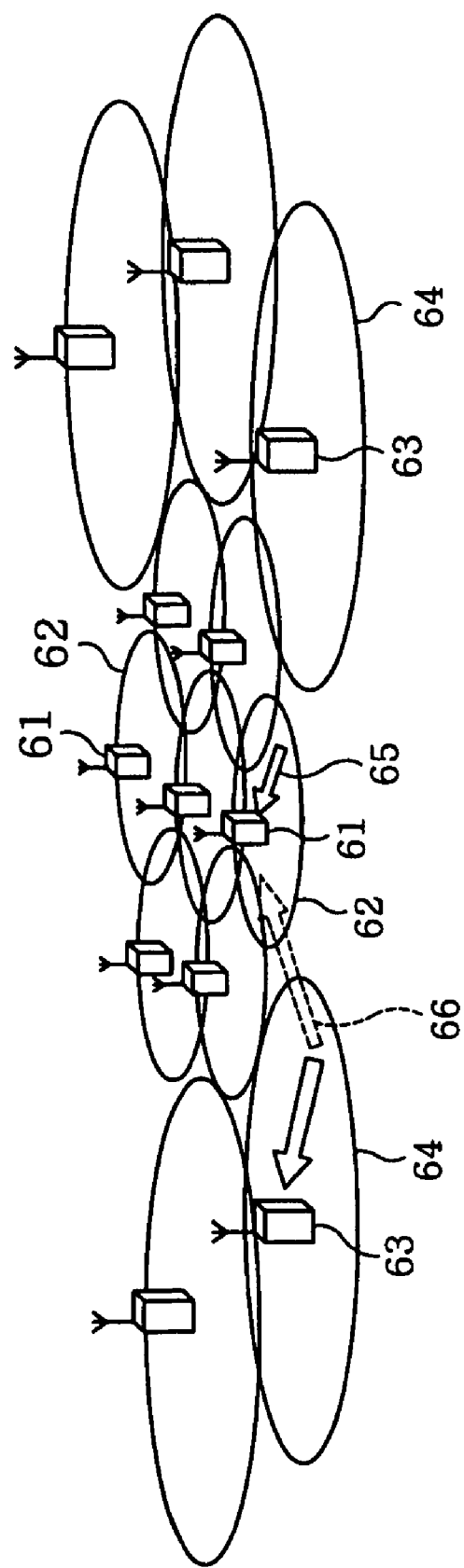
FIG. 5 provides a diagram showing an example of area configuration in a conventional base station device.

The baseband receiver 20 of the individual uplink channel, the baseband receiver 30 of the common uplink channel, the baseband transmitter 40 of the individual downlink channel, and the baseband transmitter 50 of the common downlink channel are configured same as the conventional device shown in FIG. 4.

The common downlink channel receiver 70 includes a common downlink channel synchronization unit 71; an inverse spread unit 72; a demodulator 73; a demodulation data memory 74; and a decoder 75. Herein, sampling data stored in the reception memory 15 is inputted to the synchronization unit 71 and the inverse spread unit 72, and data decoded by the decoder 75 is forwarded to the frame protocol processor 12. The common downlink channel receiver 70 operates at a start-up of the device to detect installation conditions of other base station devices of the same wireless access type and the propagation condition of radio waves that are dependent on the installation position of the base station device, and receives downlink signals of other base station devices to find out notification information and signal levels of neighboring base station devices.

In the wireless base station device configured as above, firstly, a procedure for a normal operation will be described below. The wireless unit 14, which is used for communicating with a mobile station, sequentially samples and A/D converts uplink reception data (i.e., reception spectrum spread data) to store sampling data in the reception memory 15 per sample, wherein a word length of each sampling data is two or more. The reception data accumulated in the reception memory 15 is inputted to a control channel inverse spread unit 21 and a data channel inverse spread unit 22 of the baseband receiver 20 of the individual uplink channel.

The control channel inverse spread unit 21 generates a spreading code applied for the spread modulation at the transmission side with respect to the control channel that accepts control information such as a transmission power control parameter, a transmission format and the like, and performs an inverse spread processing on the reception signal. Further, the control channel inverse spread unit 21 calculates a phase rotation amount from a known pilot pattern that is inserted, and uses the calculated result for detecting and phase-compensating data symbols. A pilot signal for demodulation is inserted into data at the control channel side. An inserting position of a pilot within a frame and a pattern of "1"/"0" thereof are set previously, which serves as a known symbol pattern at the transmission side and the reception side. Thus, upon receiving these symbols, the phase rotation amount of a wireless transmission line and the like are calculated to be used as information for synchronization detection by a demodulator 23.

The data channel inverse spread unit 22 extracts a transmission rate of reception data from the transmission format parameter detected by the control channel inverse spread unit 21, and carries out an inverse spread processing of a data channel through which user data is sent.

The demodulator 23 performs a phase compensation and a maximum ratio combination on the received data on which the inverse spreading is completed, and stores it in a demodulation data memory 24. The reception data accumulated in the demodulation data memory 24 is read out and decoded in a decoder 25. That is, the decoder 25 performs an error correction that corresponds to an encoding applied at the transmission side, and, after detecting a CRC (Cyclic Redundancy Check) by using specific parameters, performs a framing according to the data type to output it to the frame protocol processor 12.

The frame protocol processor 12 performs a frame protocol processing required for interfacing with a wired transmission line. The wired transmission line interface unit 11 performs a conversion (e.g., an ATM cell assembling and disassembling) on the data that has been processed by the frame protocol processor 12, and thus converted data is sent to the upper-level device (RNC) through the wired transmission line. Here, if an IP (Internet Protocol) transmission line rather than an ATM is used as the wired transmission line, it is connected to an IP public network through a BGW (Broadband Gate Way) router. Therefore, the wired transmission line interface unit 11 has the function of terminating Ethernet® and IP.

Further, as for the common uplink channel, the reception data accumulated in the reception memory 15 is inputted to a control channel inverse spread unit 31 and a data channel inverse spread unit 32 in the baseband receiver 30 of the common channel, as in the individual channel.

The control channel inverse spread unit 31 generates a spreading code applied for a spread modulation at the transmission side with respect to the control channel that stores control information such as a transmission format to thereby perform an inverse spread processing on a reception signal.

Further, similarly to the control channel inverse spread unit 21 in the baseband receiver 20, the control channel inverse spread unit 31 calculates a phase rotation amount from a known pilot pattern that is inserted, and uses the calculation result for detecting and phase-compensating data symbols.

The data channel inverse spread unit 32 extracts a transmission rate of the reception data from the transmission format parameter detected by the control channel inverse spread unit 31, and carries out an inverse spread processing of a data channel through which user data is sent.

A demodulator 33 performs a phase compensation and a maximum ratio combination on the received data on which an inverse spread processing has been performed, and stores it in a demodulation data memory 34. A decoder 35 performs an error correction, which corresponds to an encoding applied at the transmission side, on the reception data accumulated in the demodulation data memory 34. Then, after detecting a CRC by using specific parameters, the decoder 35 performs a framing according to the data type to thereby output the framed data to the frame protocol processor 12.

Meanwhile, a downlink signal is assembled and disassembled by the wired transmission line interface unit 11 per each channel through which the downlink signal is transmitted from an ATM line to the base station device, and then inputted to the frame protocol processor 12. The frame protocol processor 12 converts the downlink signal according to a transmission channel format, and adjusts a timing of transmitting to the wireless transmission line according to the frame protocol, and then determines whether it is an individual channel or common channel based on the received frame type. If it is an individual channel, the frame protocol processor 12 outputs the downlink signal to an encoder 41 in the baseband transmitter 40 for performing a channel encoding of the downlink individual channel. The data encoded by the encoder 41 is modulated by a modulator 42 according to a digital modulation such as QPSK (Quadrature Phase-Shift Keying) to be applied, and then provided to the spread processor 16.

The spread processor 16 performs a spread modulation on the data modulated by the modulator 42 with a specific spreading code, and outputs the spread-modulated data to the wireless unit 14.

Further, if the data processed by the frame protocol processor 12 is determined to be a common channel, it is delivered to the baseband transmitter 50 of the downlink common channel, encoded by an encoder 51, modulated by a modulator 52, and then forwarded to the wireless unit 14 via the spread processor 16.

Next, the procedure of installing the base station device, which is a feature of the present invention, will be described in detail.

First of all, the configuration required for the operation is set at a start-up of the base station device. At the start-up of the base station device, an environment of an installation place in view of a wireless access method (i.e., installation conditions of other base station devices, propagation conditions of radio waves and the like) should be found out. Thus, unlike a normal operation of a base station reception unit, the common downlink channel receiver 70 is operated to survey notification information or signal levels of neighboring base station devices.

The call controller 131 sets parameters required for the operation of the wireless unit 14 and the baseband signal processor. In the present embodiment, a CDMA-FDD (Frequency Division Duplex) method is considered. In this method, since the frequency of an uplink signal is different from that of a downlink signal, the frequency is set in a manner opposite to that for a normal operation.

Figure 2:
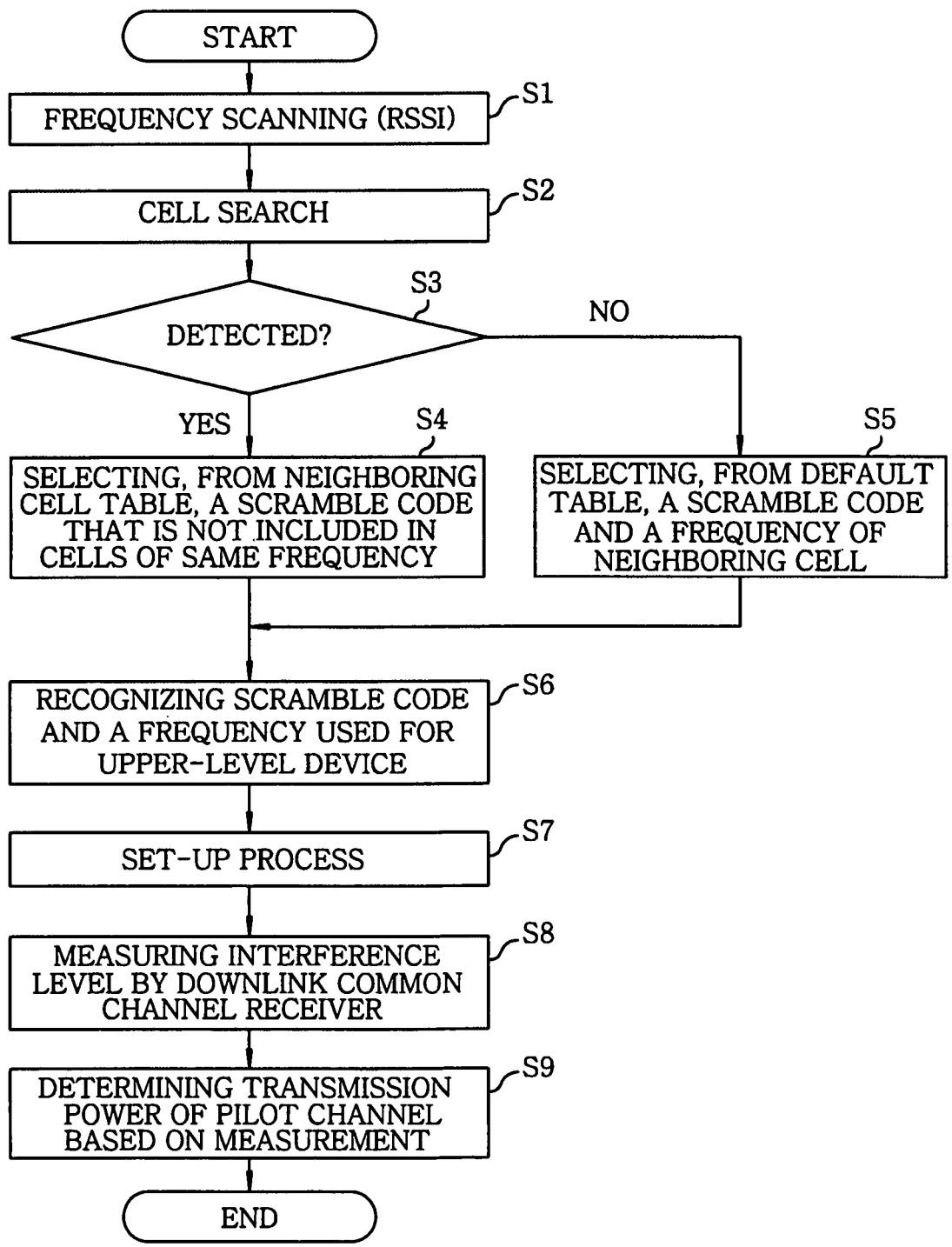
FIG. 2 presents a flow chart describing a procedure of setting a communications configuration in accordance with the invention.

Hereinafter, a procedure of setting the configuration will be described with reference to a process flow as shown in FIG. 2. Firstly, the call controller 131 executes a frequency scanning on the wireless unit 14 (step S1). That is, a carrier frequency within a frequency band allocated to the present system is sequentially set to measure a RSSI (Received Signal Strength Indicator) which is the strength of received signal.

This frequency scanning enables the scanning of a frequency being actually used. At the time of scanning, a threshold value is set for the RSSI, and each of the frequencies having a RSSI level higher than the threshold value is stored as effective frequency numbers.

Next, a cell search is conducted on the detected frequencies (step S2). In the cell search, a timing detection and a scramble code detection are performed on a perch channel which is a common downlink channel of the base station device.

In the CDMA system, there is known a three-stage cell search method. Firstly, in case the system is asynchronous between base station devices, an initial synchronization is required because it is impossible to know a timing of a downlink signal transmitted from a base station. A primary synchronization channel (P-SCH) is used for the initial synchronization, and a synchronization channel (SCH) spread-modulated with a spreading code common to the system is inverse-spread by a synchronization unit 71 in the common downlink channel receiver 70 for a correlation computation, thereby enabling a timing detection.

In the correlation computation, a matched filter (MF) is widely used. At this detection timing, a scramble code group is also identified by a secondary synchronization channel (S-SCH). That is, scramble codes applied to respective cells are grouped into a plurality of codes, and different secondary channel patterns (S-SCH pattern) are respectively applied to the groups of cells. Since the correspondences between the respective groups and the scramble codes are set previously, candidates of scramble codes applied to the respective cells are narrowed when the groups are determined by the secondary synchronization channel (S-SCH). Further, since the secondary synchronization channel pattern (S-SCH pattern) is a pattern that is dependent on a frame timing as well, it is possible to detect the frame timing of the base station device to be detected.

In a third step, a specific scramble code among the limited candidates of scramble code is identified.

Further, a reception level measurement is also conducted on the base station device detected by the cell search. By using at pilot channel (CPICH) that is constantly transmitted, parameters used for assessing a signal quality, such as Ec/No (ratio of signal power to noise power), are measured, and it is determined whether or not it is an effective cell based on a threshold value (step S3).

Subsequently, if there are cell(s) assessed to be effective in the above step, a notification channel (BCH) for transmitting notification information is received at step S4 by using the timings and scramble codes of neighboring base station devices detected by the inverse spread unit 72 and the demodulator 73 for each of cells. This notification channel contains operation conditions of the base station devices, the parameters at the time of establishing the wireless link, and neighboring cell information, so that common information is constantly sent to the terminal devices existing within the cells. Among this neighboring cell information, a frequency number and a scramble code list are demodulated by the demodulator 73 and accumulated in the demodulation data memory 74, and the notification channel is decoded to be acquired by the decoder 75.

The above step is repeatedly executed for each of the effective cells for the respective frequencies obtained by the frequency scanning of RSSI. Thus, the measurements for all of the cells that can be observed are performed, so that neighboring cell table (i.e., table of neighboring cells) that can be used at the vicinity of the installation place is updated.

As described above, the parameters to be considered under the environment for installing the base station device are extracted. That is, in the neighboring cell table prepared as above, the frequency is freely selected from effective frequency numbers, and a scramble code not included in the cells of the selected frequencies is freely outputted from the default table and is used as the scramble code of its own cell (step S4). If a carrier whose frequency is different from those of neighboring cells is set to be used, a hard handover is used for transferring a call between cells. In this case, when a cell to which the on-going call is to be transferred cannot be accessed because of a shortage in channel capacity thereof, a forced release occurs. Therefore, from the viewpoint of a call loss probability, it is preferable to minimize an occurrence frequency of handover between cells having difference frequencies. For this reason, a frequency used for a neighboring cell is also used for the present cell at the time of a cell setup of the base station device.

Meanwhile, if there is no effective cell detected, a frequency and a scramble code are selected from the default table by, e.g., using a sum of device identification number (step S5).

In the default table, a carrier frequency and a scramble code that are permitted to be used are stored. The contents of the default table are not updated in accordance with the operation conditions of the base station device, but allocated in advance depending on the present wireless communications system and a wireless communications service provider thereof.

In the search of neighboring cells in the above step S2, if a downlink transmission frequency and a scramble code of a neighboring base station are not detected at the place where the base station is to be installed, the procedure of the present embodiment proceeds to step S5. In this case, it can be deduced that the place is originally beyond the service area or in an area where the terminal device cannot be used because, e.g., its radio wave environment is highly unfavorable.

That is, it can be understood that, when selecting base station information at the time of installing the device at such a place, there is no need to consider the effect of interference caused by an overlapping of scramble code with a neighboring base station device or a downlink transmission power. Further, since it becomes an exclusive cell configuration, there is no need to consider the handover when setting the frequency. Therefore, when setting base station information of the base station device, a carrier frequency and a scramble code within a range that is allowed to be used are arbitrarily selected and set.

After determining the parameters to be used for the cell setup, the scramble code and the frequency that are used or the upper-level device (RNC) connected to the present base station device are notified (step S6), and then a cell setup is carried out (step S7). Usually, the upper-level device is connected to the base station device, and has an interface for monitoring the operation conditions of the base station device, in addition to performing an exchange between C-Plane (interoffice control signal) and U-Plane (user data) required for call connection. The parameters used for the cell setup are notified by this interface for monitoring. When the terminal device moves between cells, the upper-level device (RCN) transfers an on-going call according to a soft handover or hard handover. Hereinafter, the procedure of handover will be described in detail.

Conventionally, a terminal device monitors a signal quality by periodically measuring a reception level of a common downlink channel while a call is connected between base station devices. If the terminal device is moved to reach a cell boundary, the results of the downlink reception level measurement in other cells are notified via a base station device that is being connected to an upper-level device. Thus, if the downlink quality of another cell is assessed to be better than that of a cell that is being connected, and a channel capacity of a cell to which an on-going call is to be transferred is sufficient, the original base station device of the cell performs a control for a handover.

Here, if a radio frequency of the cell that is presently being used is identical to that of the cell to which the on-going call is to be transferred, a plurality of radio links are simultaneously down-transmitted from other cells, and the terminal device comes into a soft handover state in which a timing offset is adjusted so that the downlink signal can be received at an almost same timing. By performing the soft handover, the diversity effect can be achieved by a plurality of up/down links. However, if a radio frequency of the cell that is presently being used is different from that of the cell to which the on-going call is to be transferred, the frequency of the wireless unit needs to be changed, which requires a hard handover for instantaneously converting the frequency and the downlink scramble code of each cells.

In order to perform the handover as described above, various controls are required, such as determining whether or not a handover may be performed by the upper-level device; and designating a cell to which the on-going call is transferred. Further, it is necessary to know operation parameters of base station devices that are under the control of an upper-level device (RNC). For these reasons, in the present embodiment in which operation parameters are independently determined at the time of cell setup, a unit for notification to the upper-level device is required.

Hereinafter, a method for controlling a transmission power of a common downlink channel of a wireless base station device will be described.

Generally, a transmission power of a common downlink channel of a wireless base station device is operated at a fixed value. That is, if the area covered by the base station device is fixed at the time of an area configuration, the reception level of the terminal device located within the cell should be set to be a level at which a sufficiently high signal quality can be obtained. If the transmission power is too low in the area, conditions for the area configuration are usually not satisfied. However, if the transmission power is too high, this also affects the communications quality in neighboring cells by interferences. Further, the terminal device performs communications through a cell selected for having a highest level among a list of cells detected by a cell search. Thus, if the transmission level of the installed base station device is low and the levels of other cells are high, there exists a possibility that, although the base station device has been installed, only the cells of other base station devices are used.

In order to set a proper power level for avoiding the above problems in the present embodiment, the interference level is measured by the common downlink channel receiver 70 (step S8), and the transmission power level of the pilot channel (CPICH) is determined based on the result of the measurement (step S9). The measurement of the interference level is carried out by demodulating a downlink signal by a conventional method by using the scramble code and the frequency that are notified in step S6.

In the present embodiment, it is assumed that the base station device corresponds to a sufficiently narrow area. If the common channel transmission power is as low as, i.e., about several dBm, an offset value (according to an interference level) is added to a default level of transmission power of the pilot channel. Thus, an area configuration is implemented by using a power level higher than those of neighboring cells. The downlink transmission powers of other channels are all determined by using an offset value predefined based on the power level of the pilot channel. Thus, the transmission power can be easily adjusted based on the installation environment by considering the pilot channel. Further, if the interference level is high and beyond the transmission power, it may be desirable that the transmission power is set to be sufficiently small, or the procedure of the present embodiment returns to step S3 to thereby select other frequency.

The common downlink channel receiver 70 of the base station device, which is the feature of the first embodiment as shown in FIG. 1, needs to be started up only at the time of setting the configuration of the base station device. Therefore, for example, in the baseband signal processor including a DSP (Digital Signal Processor), a file downloaded as firmware is made to be convertible between an initial configuration and a normal operation. If a signal format of physical channel level is, although different for uplink and downlink, set based on each functional unit, signal processing functions of operation level, such as spreading/inverse spreading, encoding/decoding, and the like, are commonly used in many cases. Therefore, it is easy to implement the signal processing function by a combination of signal processing blocks modularized.

In accordance with the present embodiment, in a small-scale area configuration for a wireless base station device to be freely installed by a user, the base station device can automatically execute settings of a spreading code or a transmission power required for the installation of the base station device itself. This is implemented by converting a baseband signal processing into a downlink signal reception of other base station devices and finding out notification information or signal levels of neighboring base station devices of wireless access type to thereby detect installation conditions and radio wave propagation conditions of the neighboring base station devices that are dependent on the installation place of the wireless base station device. In addition, since the wireless base station device has the initial cell search function same as that of the terminal device, it is possible to acquire neighboring base station information in the actual installation environment. Therefore, it is possible for the base station to independently set parameters inherent thereto suitable for the actual environment, and also to cope with an environment where a booster is installed. Further, in the wireless base station device, since various parameters suitable for the actual environment can be independently set, only a notification to the upper-level device is necessary. Therefore, it is possible to execute the parameter setting without imposing any load on the upper-level device.

Also, in the above embodiment, the call controller 131 may be configured to have an interface with a radio module equivalent to a terminal. That is, it is also possible that the call controller 131 has a configuration having an interface with a radio module equivalent to a terminal. That is, it may be embodied in a manner that by preparing a wired interface function for a control signal with a modularized terminal device for communicating with the base station device and setting a communications protocol control to the terminal device, a downlink signal of neighboring base station devises can be received by using the modularized terminal device in order to acquire the installation condition of other base station devices or the propagation condition of radio waves by a wireless access method that is required at the time of installation of the base station device and notification information and signal levels of neighboring base station devices can be measured, so that the setting of a spreading code, transmission power, and the like, required for the installation of the base station device itself, can be automatically executed. In this case, the frequency scanning function, the cell search function, the reception level measuring function and the notification information reception function that are activated by the terminal device are applied to a connected module, so that it is sufficient to change a software of the call connection controller.

Next, a configuration of the receiver of the present embodiment will be described.

Figure 3:
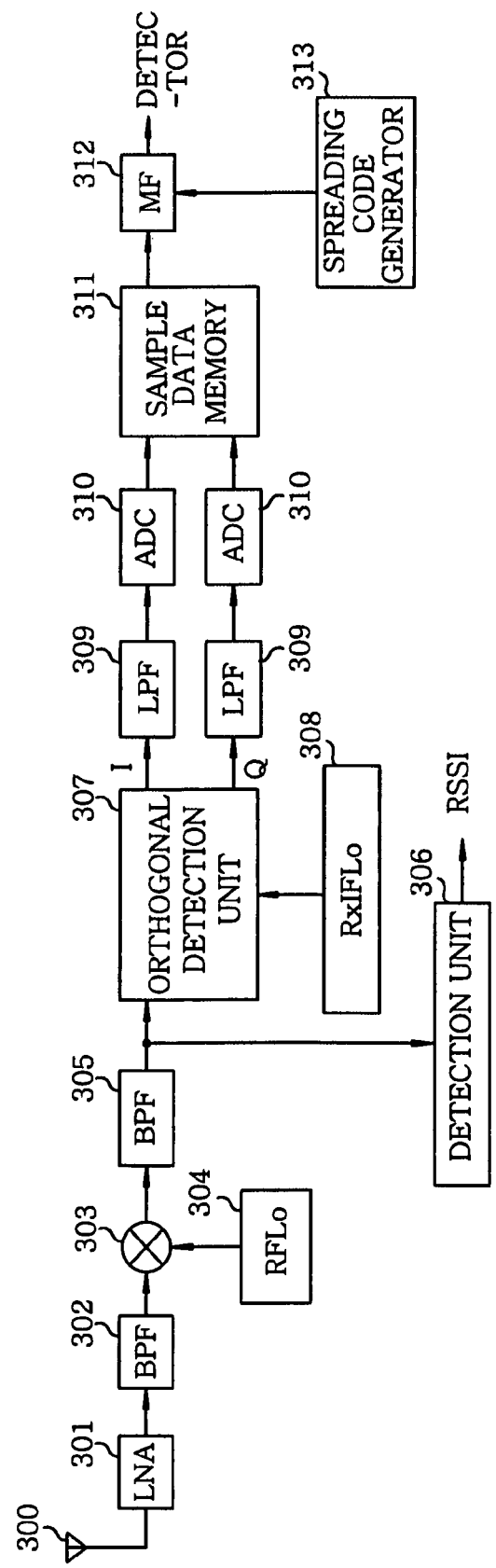
FIG. 3 offers a block diagram illustrating an exemplary configuration of a receiver in accordance with the invention.

FIG. 3 provides a block diagram showing an exemplary configuration of the receiver. A downlink signal received by an antenna 300 is inputted to a mixer 303 via a low noise amplifier (LNA) 301 and a band pass filter (BPF) 302. In the mixer 303, the downlink reception signal is converted into an IF signal by being mixed with an output from an RF local oscillator (RFLo) 304, and outputted from the mixer 303 to be inputted to a detection unit 306 and 307 via a BPF 305. An intensity of the received signal is detected by the detection unit 306 to be outputted as an RSSI signal of a reception level to a baseband signal processor (not shown).

Meanwhile, the signal outputted from the band pass filter 305 and inputted to the orthogonal detection unit 307 is subject to a digital orthogonally detection by the orthogonal detector 307 by using an output from a reception IF local oscillator (RxIFLo) 308, and then outputted as I/Q signals to the baseband signal processor via low pass filters (LPFs) 309 and AD converters (ADCs) 310. The baseband signal processor stores digital I/Q signals, which is outputted from the AD converters 310, in a sample data memory 311, and calculates a correlation with a spreading code in a matched filter (MF) 312. The matched filter (MF) 312 obtains a reception signal by a path detection based on the correlation computation, as well as a synchronous detection and an inverse spread demodulation. Reference numeral 313 denotes a spread code generator which generates a spreading code applied at the time of inverse spread processing.

(Second Embodiment)

Hereinafter, a second embodiment of the present invention will be described in detail with reference to the accompanying drawings.

Figure 6:
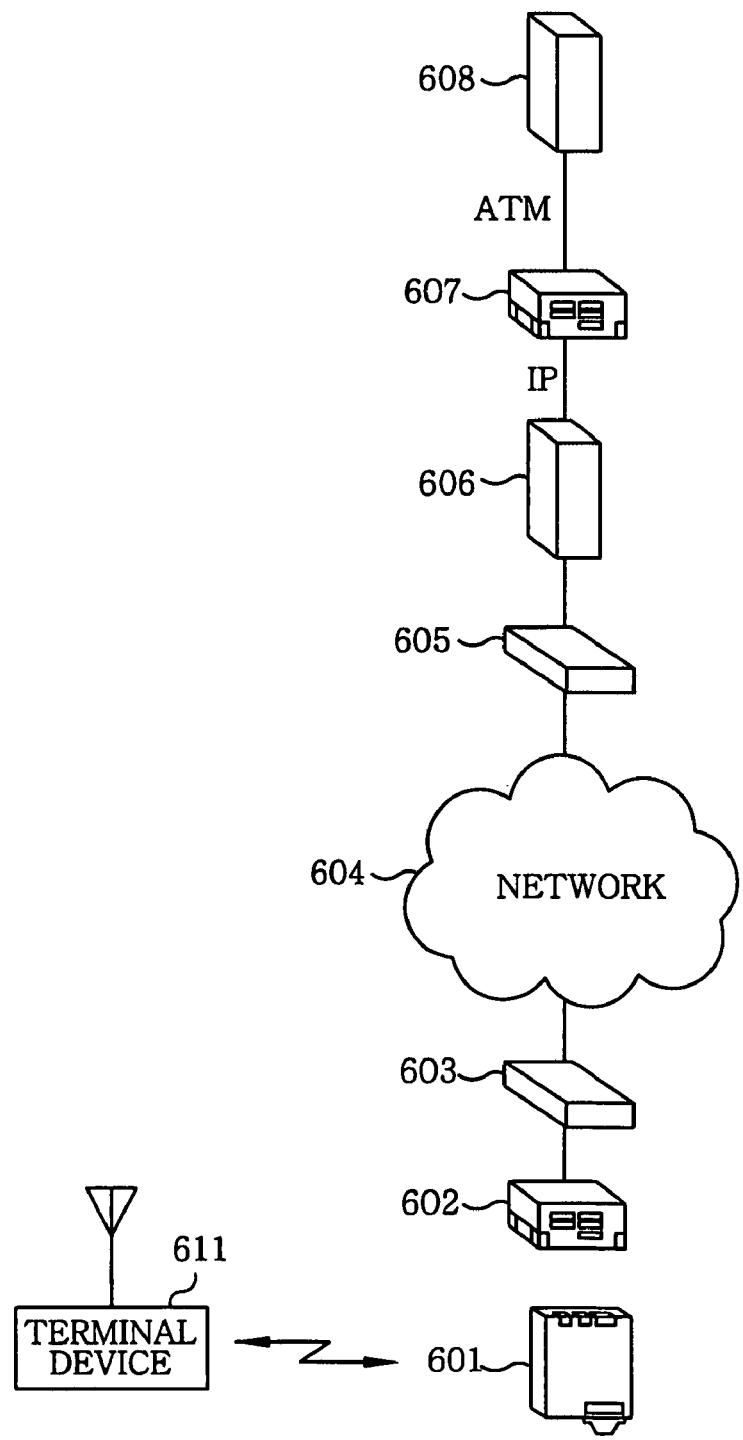
FIG. 6 is a diagram illustrating an exemplary configuration of a wireless communications system in accordance with a second embodiment of the present invention.

FIG. 6 is a diagram illustrating an exemplary configuration of a wireless communications system in accordance with a second embodiment of the present invention.

The wireless communications system of the second embodiment includes a terminal device 611, a base station device (radio base station device) 601, a router 602, a modem 603, a network 604 comprised of a telephone line, an optical fiber and the like, a circuit-terminal equipment 605, a server 606, a gateway 607, and a base station controller (radio base station controller) 608.

Here, this embodiment illustrates a case of using PPPoE, wherein the base station device 601 is equipped with a PPPoE client function and the server 606 is equipped with a PPPoE server function. Further, the router 602 has a PPPoE pass-through function, and the base station device 601 and the router 602 are connected to Ethernet®. The abbreviation PPPoE stands for Point-to-Point Protocol over Ethernet®, and is a technology that transmits a PPP frame by capsulating same by an Ethernet frame and passing it through Ethernet.

Further, in the second embodiment, the server 606 and the gateway 607 are connected through an IP (Internet Protocol) line, and the gateway 607 and the base station controller 608 are connected through an ATM (Asynchronous Transfer Mode) line. The base station device 601 and the base station controller 608 are connected through an IP network.

The base station device 601 and the router 602 do not necessarily have to be connected through a wired line, and, for example, they may be connected through a wireless line such as a wireless LAN (Local Area Network), a wireless MAN (Metropolitan Area Network) or the like.

Further, in the second embodiment, the base station device 601 is sold from a communication provider side to a user side of a general home, and the base station device 601, the router 602 and/or the modem are installed in the house of that user. Further, the terminal device 611 is portable and used by the user in the house. The circuit-terminal equipment 605, the server, the gateway 607 and/or the base station controller 608 are installed at the communication provider side, and a public line or a private line is used as the network 604.

In addition, in the second embodiment, the small base station device 601 (for example, Femto BTS) having a function capable of wireless communications between two terminal devices at the same time is employed.

Further, in the second embodiment, wireless communications is carried out between the base station device 601 and the terminal device 611 by using a CDMA (Code Division Multiple Access) scheme.

Besides, in the second embodiment, the user installs the base station device 601, and, when its power is turned on by the user, the base station device 601 performs a process of automatically setting such setting data as a frequency (carrier) and a primary scrambling code used in the wireless communication, thereby setting the setting data.

Here, in the CDMA type, the primary scrambling code is to identify each base station device if there are a plurality of base station devices, and a different primary scrambling code is set to each base station device.

Further, in the CDMA type, there are other codes such as channelization code and so on, which are set differently for each user and/or each service.

Figure 7:
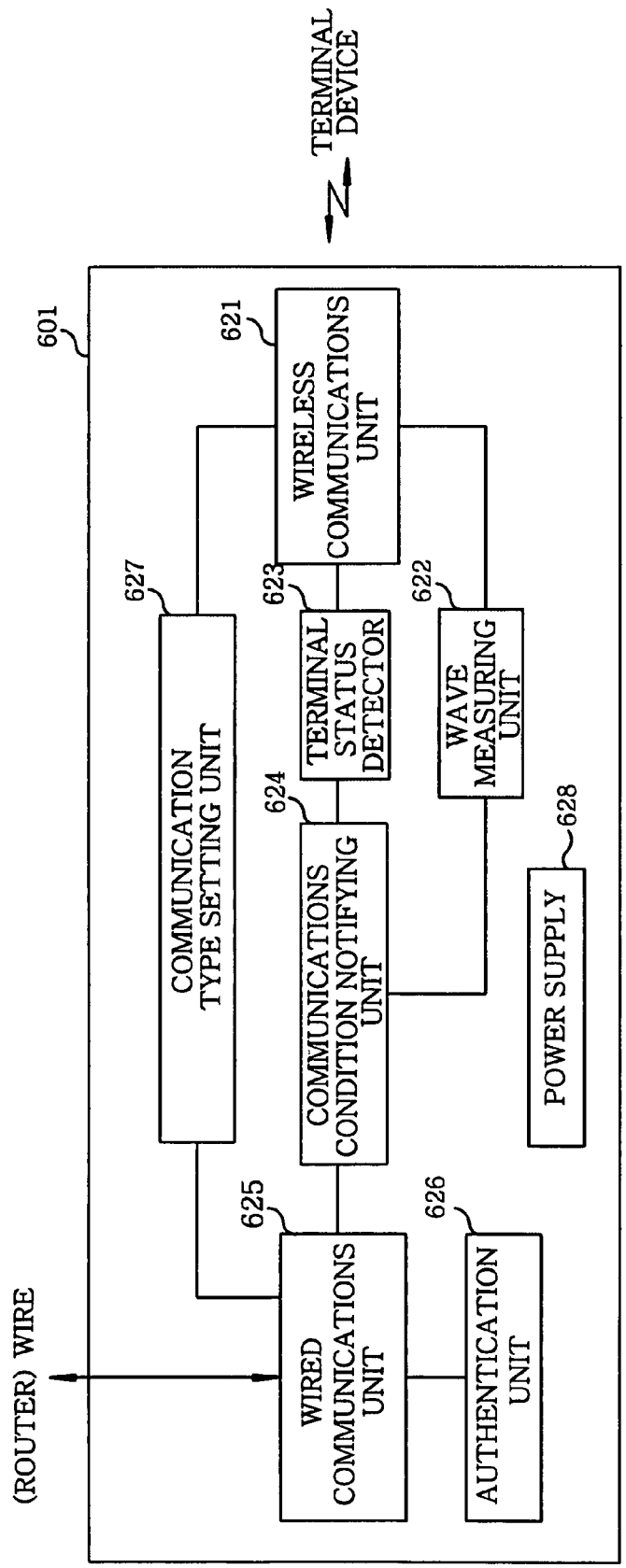
FIG. 7 provides a block diagram of one example of a schematic functional configuration of a base station device in accordance with the second embodiment.

FIG. 7 provides a block diagram of one example of a schematic functional configuration of the base station device 601 of the second embodiment.

The base station device 601 of the second embodiment is provided with a wireless communications unit 621 having a function of performing wireless communication, a wave measuring unit 622 having a function of measuring radio waves, a terminal status detector 623 having a function of detecting a communications status of the terminal device 611, a communications condition notifying unit 624 having a function of notifying a communications status of its local device (the base station device 601) or of terminal device 611, a wired communications unit 625 having a function of carrying out wired communication, an authentication unit 626 having a function of performing an authentication process, a communications type setting unit 627 having a function of setting a communications type (here, setting data), and a power supply 628 having a function of controlling ON/OFF of a power through the use thereof.

The following is a description for a frequency and a primary scrambling code to be set in the base station device 601 of the second embodiment.

In the second embodiment, a combination of a frequency and a primary scrambling code are first considered. Even in case of performing wireless communications using a same frequency, it is possible to identify a signal by making a primary scrambling code different. Due to this, in the second embodiment, if there are a multiplicity of base station devices, a combination of a frequency and a primary scrambling code is set to the base station device 601 based on setting data in order to avoid an interference which may occur when a signal (radio waves) sent from one side base station device by wireless reaches the other side base station device, in the two base station devices that perform wireless communications using a combination of a same frequency and a same primary scrambling code.

Further, in the second embodiment, although no interference occurs between base station devices, a combination of a frequency and a primary scrambling code is set to the base station device 601 based on setting data in order to avoid an interference that, may arise in the terminal device 611.

Figure 8:
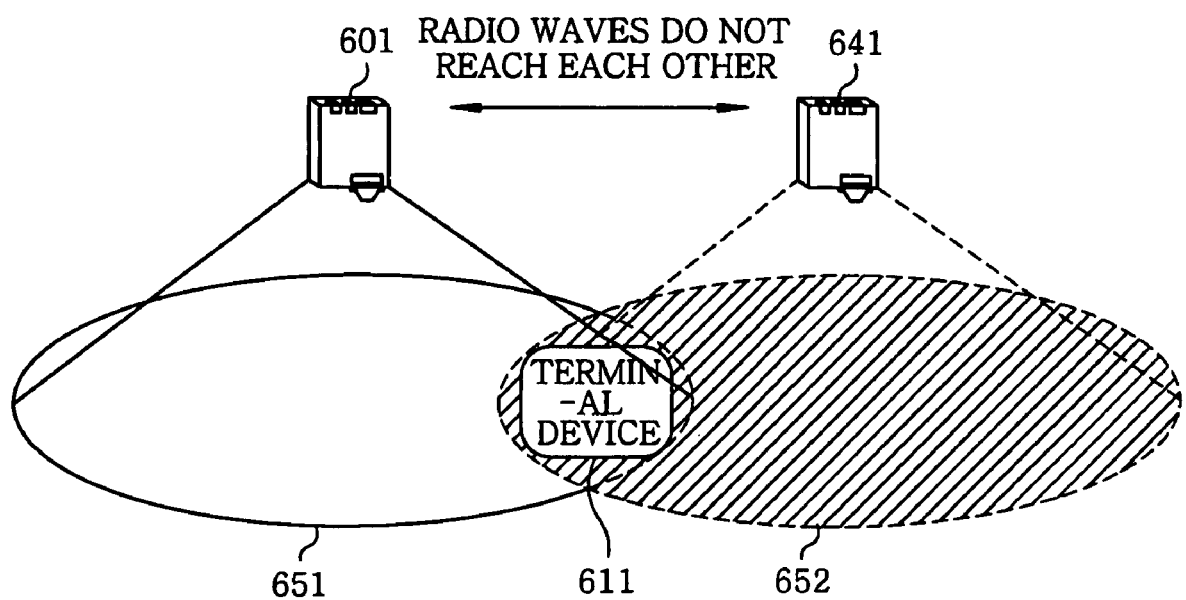
FIG. 8 illustrates a case where interference arises in a terminal device.

FIG. 8 illustrates a case where interference arises in the terminal device 611.

That is, since radio waves do not reach between the base station devices 601 and 641 which use a same frequency and a same primary scrambling code, they do not interfere with each other. However, in case there exists an overlapping region between a region 651 where radio waves from the base station device 601 reach and a region 652 where radio waves from the base station device 641 reach, when the terminal device 611 lies in the overlapping region, the terminal device 611 receives the radio waves from the base station devices 601 and 641 arranged on both sides, thereby generating an interference. In the second embodiment, in order to avoid this situation as well, the setting data is also set to the base station device 601.

Here, as one example, the regions 651 and 652 where the radio waves from each of the base station devices 601 and 641 reach may be a circle type of regions of about 50 to 100 m in radius.

Further, in another configuration example which does not use a primary scrambling code, since an interference occurs when a signal (radio waves) sent from one side base station device by wireless reaches the other side base station device in the two base station devices that conduct wireless communications using a same frequency, a frequency is set to the base station device in order to avoid such interference. In addition, in this case, since an interference arises when the radio waves from the two base station devices that perform the wireless communications using the same frequency reach the terminal device, a frequency is set to the base station device based on setting data in order to avoid such interference. In this configuration, the setting data about the frequency used in the wireless communications is set to the base station device.

Now, one example of an operation that is carried out in the wireless communications system of the second embodiment will be given with reference to FIGS. 9 to 11.

Figure 9:
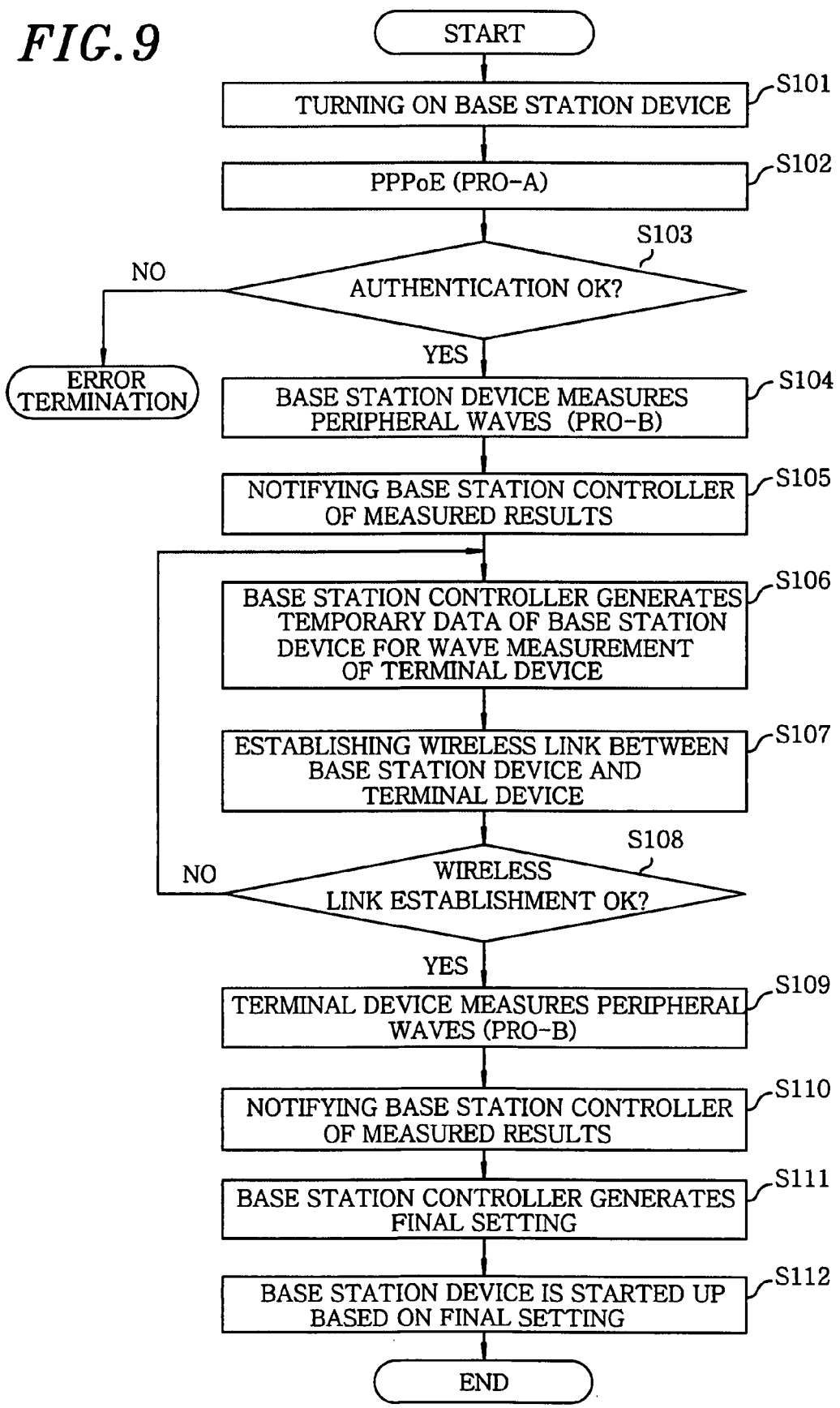
FIG. 9 describes one example of a processing procedure which is carried out when the base station device in accordance with the second embodiment is started up.

FIG. 9 illustrates one example of a processing procedure which is conducted when the base station device 601 is started up.

Figure 10:
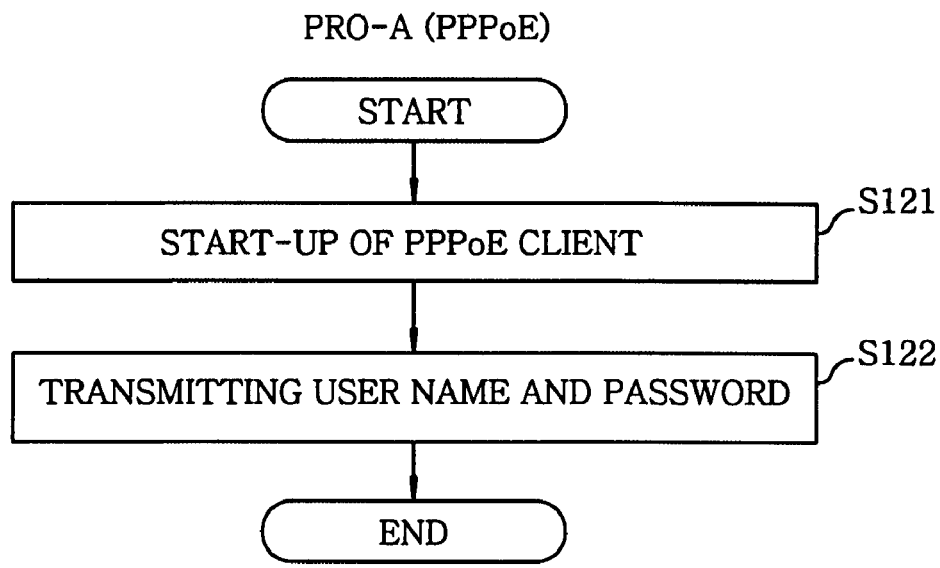
FIG. 10 presents one example of a start-up processing procedure of PPPoE in accordance with the second embodiment.

FIG. 10 describes one example of a start-up processing procedure of PPPoE.

Figure 11:
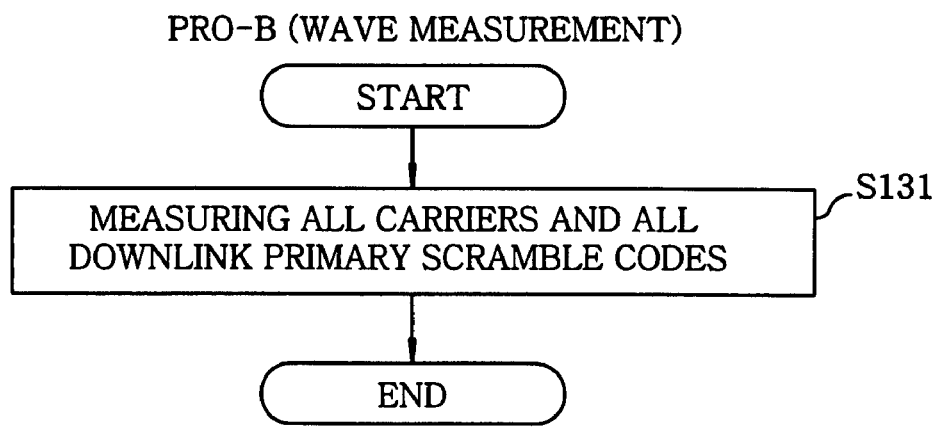
FIG. 11 illustrates one example of a processing procedure of radio waves measurement in accordance with the second embodiment.

FIG. 11 presents one example of a processing procedure of radio waves measurement.

First of all, when a user connects the base station device 601 to the router 602 and switches its power from OFF to ON by manipulation of the power supply 628 of the base station device 601 (step S101), the base station device 601 executes a start-up process of PPPoE (step S102).

In the start-up process of PPPoE, the base station device 601 starts up a PPPoE client function (step S121), and sends information on a user name and password to the server 606 by the wired communications unit 625 (step S122). This information is sent from the base station device 601 and forwarded to the server 606 via each of the units 2 to 5 interposed therebetween.

Here, the information on a user name and/or password is stored in advance in, for example, a memory of the authentication unit 626 and so on at the time the base station device 601 is sold, and the authentication process using the user name and/or password is controlled by the authentication unit 626. Further, as another configuration example, it is also possible to use such a configuration as inputting the information on a user name and/or password to the base station device 601 by the user.

The server 606 stores the information on a user name and/or password allocated to each base station device 601 (or each user) in the memory and recognizes it, and determines whether the information on a user name and password received from the base station device 601 is legitimate or not (step S103). If it is determined to be illegitimate, the server 606 closes the process as being an error, whereas if it is determined to be legitimate, the server 606 allocates an address for communicating with the base station controller 608 to the base station device 601 and sends the base station device 601 a signal indicative of an authentication permission (authentication OK) including the address information of the base station device 601 and/or that of the base station controller 608 to the base station device 601. This signal is sent from the server 606 and provided to the wired communications unit 625 of the base station device 601 via each of the units 602 to 605 interposed therebetween.

As described above, in the second embodiment, the authentication of the base station device 601 is conducted by using the user name and password previously stored in the base station device 601 by the PPPoE server 606 of the communication provider. And, if the authentication is permitted by the authentication (check of the user name and password) of the PPPoE server 606, an address is allocated to the base station device 601 and at the same time an address of the base station controller 608 is notified to the base station device 601. By this authentication work, only the permitted base station device 601 can communicate with the base station controller 608.

When the base station device 601 is notified that the authentication has been made by the server 606, it executes a process of measuring radio waves of peripheral radio waves environment (step S104).

In the process of measuring radio waves, the base station device 601 sequentially sets various frequencies and various primary scrambling codes (downlink sent from the base station device) to the wireless communications unit 621 by the communications type setting unit 627, performs radio reception with respect to each combination of frequencies and primary scrambling codes by the wireless communications unit 621, and measures (detects) a level of a signal (radio waves) from other base station devices based on the signal received by wireless with respect to each combination of frequencies and primary scrambling codes by the wave measuring unit 622. In the second embodiment, information of all frequencies and all primary scrambling codes (downlink sent from the base station device) which are usable in the system are stored in the memory of the communications type setting unit 627 and a level of a received signal is measured for each of all these combinations (step S131).

Here, as the method for acquiring a level of a received signal for a combination of one frequency and one primary scrambling code, a method for acquiring a correlation level by inverse-spreading a received radio signal with the frequency through the use of the primary scrambling code may be used. In this case, a high correlation value which is acquired when a radio signal using a same frequency and a same primary scrambling code is received and a low correlation value which is acquired when it is not received can be determined by a threshold value and so on.

Further, in another configuration example which does not use a primary scrambling code, radio reception is performed for each of all frequencies usable in the system. For example, for a frequency at which a reception level is greater than a threshold value, it can be determined that a signal is received from other base station devices using the same frequency, and for a frequency at which a reception level is less than the threshold value, it can be determined that a signal is not received from other base station devices using the same frequency.

The base station device 601 sends information on the result of measurement for peripheral radio waves obtained by the wave measuring unit 622 to the base station controller 608 via the wired communications unit 625 (step S105). This information is sent from the base station device 601 and reported to the base station controller 608 via each of the units 602 to 607 interposed therebetween. In addition, in the second embodiment, information on a level of a received signal for a combination of each frequency and each primary scrambling code is used as the information on the result of radio waves measurement.

The base station controller 608 prepares temporary setting contents for the base station device 601 on the basis of the information on the result of radio waves measurement reported from the base station device 601, and sends information on the setting contents to the base station device 601 (step S106). This information is sent from the base station controller 608 and provided to the wired communications unit of the base station device 601 via each of the units 602 to 607 interposed therebetween.

Specifically, the base station controller 608 stores a list of all frequencies and all primary scrambling codes usable in the system in the memory and recognizes the same. For example, based on the result of radio waves measurement reported from the base station device 601, the base station controller 608 detects at least one combination of frequencies and primary scrambling codes which are used by other base station devices existing at the peripheral place which gives interference to the base station device 601. In addition, it detects at least one combination of frequencies and primary scrambling codes, which are different from the detected combinations and usable in the system, as candidates, and notifies the base station device 601 of information on one of the candidates of the detected combinations as the temporary setting contents information.

Here, it is desirable that the combination selected for notification from the base station controller 608 to the base station device 601 is the one that is never used in other base station devices existing around the base station device 601. However, since there may be a case where such combination is not found, for example, a combination of a certain frequency and primary scrambling code may be selected although a reception signal level in the base station device 601 for such combination is relatively small.

As one example, it may be possible that, among all combinations of frequencies and primary scrambling codes, a combination with the minimum reception signal level in the base station device 601 is selected and notified to the base station device 601. In this case, the combination that is presumed to cause the smallest interference can be selected, which generates no interference or small interference if any.

When the base station device 601 receives the temporary setting contents information from the base station controller 608, it determines a combination of a frequency and a primary scrambling code, which is used in wireless communication, based on the setting contents by the communications type setting unit 627, and sets the setting data for setting such combination to the wireless communications unit 621. Further, the base station device 601 establishes a radio link between itself and the terminal device 611 that exists in the communication area by using the temporary setting contents by the wireless communications unit 621 (step S107). In general, the terminal device 611 searches a base station device capable of wireless access while always doing a change to a combination of a frequency and a primary scrambling code which is usable in the system, and attempts the wireless access when such a base station device is found.

As described above, the base station device is started up by the temporary setting and the process of establishing the radio link between the base station device 601 and the terminal device 611 is carried out. However, if the radio link between the base station device 601 and the terminal device 611 is not established by the temporary setting contents (step S108), the situation is notified from the base station device 601 to the base station controller 608 to again execute the processes of steps S106 to S108. Namely, the base station controller 608 sends information on new temporary setting contents to the base station device 601 to again execute the above process so that the radio link between the base station device 601 and the terminal device 611 can be established. Here, for example, information for setting one arbitrary combination or one combination based on the priority, except for the combination that has been already notified to the base station device 601, among the candidate combinations, is used as the new temporary setting contents information.

Further, in another configuration example, it is possible that more than two combinations of frequencies and primary scrambling codes are arranged and notified as the temporary setting contents information from the base station controller 608 to the base station device 601. As one example, it is possible that, among all combinations of frequencies and primary scrambling codes, a certain number (more than 2) of combinations are selected in the order of small reception signal level and notified to the base station device 601.

In addition, in case of notifying more than two combinations, it is also possible that the priority (preferable order) is notified from the base station controller 608 to the base station device 601 so that the base station device 601 attempts the use of combinations in the sequence according to the priority.

Also, in the method for determining a combination of a frequency and a primary scrambling code to be used by the base station device 601 based on the temporary setting contents notified from the base station controller 608, for example, if only one combination is notified as the temporary setting contents, that combination can be determined to be used, and if more than two combinations are notified as the temporary setting contents, one arbitrary combination or one combination based on the priority out of them can be determined to be used.

The terminal device 611 executes the process of radio waves measurement for peripheral environment when the radio link between itself and the base station device 601 is established (step S109) or always executes the process of radio waves measurement for peripheral environment regardless of the radio link therebetween, and sends information on the result of radio waves measurement to the base station device 601 by wireless. This information is received by the wireless communications unit 621 of the base station device 601 via the radio link established between the base station device 601 and the terminal device 611.

In addition, the terminal device 611 stores the information on all frequencies and all primary scrambling codes (downlink sent from the base station device) that are usable in the system in the memory, and the radio waves measuring process by the terminal device 611 is carried out, as done by the base station device 601 (step S131).

Here, the reason that the terminal device 611 measures the radio waves situation of its periphery (radio waves situation from the base station device) is because although the base station devices 601 and 641 are arranged at the places where radio waves do not reach each other, there may exist an environment such as a failure of communications which occurs because radio waves from the base station devices 601 and 641 on both sides interfere at the place of the terminal device 611, as shown referring to FIG. 8.

When the base station device 601 receives the information on the result of radio waves measurement from the terminal device 611, it detects that information by the terminal status detector 623 and sends the same to the base station controller 608 via the wired communications unit 625 by the communications condition notifying unit 624 (step S110). This information is sent from the base station device 601 and delivered to the base station controller 608 via each of the units 602 to 607 interposed therebetween.

Here, the information on the result of radio waves measurement obtained by the terminal device 611 is sent from the terminal device 611 towards the base station controller 608. For example, the base station device 601 relaying the information may relay/send the same to the base station controller 608 without particularly processing it, or may send to the base station controller 608 after formal processing without any change of the information contents from the terminal device 611 in the base station device 601.

The base station controller 608 prepares final setting contents for the base station device 601 based on the information on the result of radio waves measurement reported from the terminal device 611, and sends the same to the base station device 601 (step S111). This information is sent from the base station controller 608 and forwarded to the wired communications unit 625 of the base station device 601 via each of the units 602 to 607 interposed therebetween.

Here, the final setting contents are prepared by considering both the information on the result of radio waves measurement obtained by the base station device 601 and that obtained by the terminal device 611. Specifically, if no interference is generated in the terminal device 611 even by the temporary setting contents (frequency and primary scrambling code) set in the base station device 601 based on the information on the result of radio waves measurement obtained by the base station device 601, the temporary setting contents are determined to be the final setting contents. Meanwhile, if an interference, such as having a large reception level exceeding a threshold value detected, is generated in the terminal device 611 by the temporary setting contents (frequency and primary scrambling code) set in the base station device 601 based on the information on the result of radio waves measurement obtained by the base station device 601, other combination of a frequency and a primary scrambling code is determined to be the final setting contents so that such interference is not generated in any of between the base station devices and the terminal device, or small (preferably, minimum) interference is occurred, and then notified to the base station device 601. Further, as for the method for selecting the combination of a frequency and a primary scrambling code, for example, it is possible to use the same method as the case of selecting the preferable combination based on the information on the result of radio waves measurement obtained by the base station device 601.

When the base station device 601 receives the final setting contents information from the base station controller 608, it determines a combination of a frequency and a primary scrambling code, which are used in the wireless communication, based on the setting contents by the communications type setting unit 627, and sets the setting data for setting such combination to the wireless communications unit 621. In addition, the base station device 601 establishes a radio link between itself and the terminal device 611 that exists in the communication area by using the final setting contents by the wireless communications unit 621 (step S112).

Further, if the final setting contents are different from the temporary setting contents, the base station device 601 is started up based on the new setting contents, while if the final setting contents are the same as the temporary setting contents, the base station device 601 is not particularly started up in response to the above.

By the above process, in the wireless communications system of the second embodiment, only the base station device 601 authenticated by the communication provider can be stared up by automatically conducting the process of setting the frequency and the primary scrambling code that are used in the wireless communication. Further, the user carries out only the procedure of installing the base station device 601 at the place such as a general home, connecting to the router 602 and setting power-on, thereby automatically executing the setting of the base station device 601. In the second embodiment, under the circumstance that a plurality of base station devices are installed at arbitrary places, a base station device to be installed later is set to avoid an interference, without any change in the setting of a previously installed base station device.

As set forth above, in the wireless communications system of the second embodiment, when the power is ON, the base station device 601 receives radio waves from other base station devices existing on the periphery thereof and measures a level of received radio waves for each communications type (in the second embodiment, a combination of a frequency and a primary scrambling code). And then, it notifies an upper-level device (in the second embodiment, the base station controller 608) of the result of measurement, and, in response to this, the upper-level device determines a communications type suitable for use in the base station device 601 based on the result of measurement and notifies the base station device 601 of the above. In response to this, the base station device 601 sets the communications type notified from the upper-level device to thereby commence wireless communications with the terminal device 611.

Further, in the wireless communications system of the second embodiment, the terminal device 611 also receives radio waves from the base station device, measures the received radio waves situation, and notifies the upper-level device of the result of measurement via the base station device 601. In response to this, the upper-level device determines a communications type suitable for use in the base station device 601 based on the result of measurement in order to avoid an interference if any in the terminal device 611, and notifies the base station device 601 of it. In response to this, the base station device 601 sets the communications type notified from the upper-level device to thereby execute the wireless communications with the terminal device 611. In addition, in this case, the base station device 601 may not execute the setting of the communications type (the setting of the same communications type) if there is no need to change the communications type set at present.

Further, in the wireless communications system of the second embodiment, when the power of the base station device 601 becomes ON, an authentication unit (in the second embodiment, the server 606) arranged on the higher side executes an authentication process for the base station device 601 by using a password and so on, and permits the access of the base station device 601 and the upper-level device (in the second embodiment, the base station controller 608) only if the password and so on are authenticated to be legitimate.

Therefore, in the wireless communications system of the second embodiment, the general user does not need to do the input of the setting data to the base station device 601 by pressing a certain key, and due to this, the communication provider does not need to teach the contents of setting data to the general user. Further; the setting of the base station device is automatically conducted by doing a manipulation of applying the power to the base station device 601 (for example, only by this power-on manipulation except for installation work) by the general user, so that the base station device 601 can be started up for wireless communication.

Here, although the combinations of frequencies and codes by kinds of the base station device (primary scrambling codes) are used as the communications types in the second embodiment, only frequency may be used as another configuration example.

Further, the second embodiment illustrates the configuration in which the temporary setting data (temporary communications type) is first set to the base station device 601 based on the information capable of estimating the interference status between the base station devices, and then the final setting data (final communications type) is set to the base station device 601 based on the information capable of estimating the interference status of the terminal device 611. As another configuration example, the configuration that carries out only one of the two setting processes based on these two information may be used.

In addition, in the base station device 601, as one example, when the power is switched from ON to OFF by manipulation of the power supply 628, the setting data (information specifying the communications type) set at that time is deleted from the memory, and the configuration which executes the setting process of the setting data as in the second embodiment is used when the power is switched from OFF to ON later. Further, as another example, in the base station device 601, when the power is switched from ON to OFF by manipulation of the power supply 628, the setting data set at that time is maintained in the memory, and the configuration that performs the process, such as initially setting the setting data maintained in the memory, may be used when the power is switched from OFF to ON later.

Also, in the base station device 601 of the second embodiment, a power-on means is configured by the function of the power supply 628, a detection means of the radio reception status for each communications type is configured by the function of the wireless communications unit 621 or of the wave measuring unit 622, and a transmission means of information on the radio reception status is configured by the function of the communications condition notifying unit 624 or of the wired communications unit 625. Further, a reception means of information specifying the communications type is configured by the function of the wired communications unit 625, a setting means of the communications type is configured by the function of the communications type setting unit 627, a wireless communications execution means is configured by the function of the wireless communications unit 621, a reception means (status receiving means) of information on the radio reception status in the terminal device 611 is configured by the function of the wireless communications unit 621 or of the terminal status detector 623, and an authentication request means or an authentication result receiving means is configured by the function of the authentication unit 626 or of the wired communications unit 625.

Here, the configuration of the system or device of the present invention is not necessarily limited to that given above, but various configurations may be used. Further, the present invention may provide a method or type which executes the process of the present invention, a program of implementing the method or type, or a storage medium storing the program, and various systems or devices.

Additionally, the present invention is not limited to the application fields mentioned above, but can be applied to various fields.

Furthermore, for example, a configuration in which a processor is controlled by execution of the control program stored in ROM (Read Only Memory) may be employed as a variety of processes which perform in the system or device of the invention, in hardware resources having the processor and/or memory. Besides, for example, each functional means for executing a corresponding process may be configured as an independent hardware circuit.

Moreover, the present invention can execute the process of the invention by using a computer-readable storage medium such as a floppy disk® or CD (Compact Disc)-ROM and the like which store the control program, or by the program itself, and by inputting the control program to the computer from the storage medium and executing the processor.

While the invention has been shown and described with respect to the embodiments, it will be understood by those skilled in the art that various changes and modification may be made without departing from the scope of the invention as defined in the following claims.

What is claimed is:

1. A wireless base station, comprising:
a wireless unit for performing wireless communications with a mobile station;
a reception memory unit for storing therein reception spectrum spread data per sample as reception data, wherein the reception spectrum spread data is received by the wireless unit and sequentially sampled;
a baseband reception unit for processing and decoding the reception data stored in the reception memory unit;
a common downlink channel reception unit, activated at a start-up of said wireless base station, for receiving a downlink signal of one or more other base stations by using the reception data stored in the reception memory unit;
a frame protocol processing unit including an interface for communicating with a wired transmission line for an upper-level device, for performing a frame protocol processing for the interface to convert a transmission channel format with respect to an uplink signal received by the baseband reception unit and a downlink signal transmitted from the upper-level device;
a baseband transmission unit for encoding downlink data outputted from the frame protocol processing unit, and digitally modulating to output encoded data;
a spread processing unit for spread-modulating the encoded data outputted from the baseband transmission unit to output spread-modulated data to the wireless unit; and
a call controller for controlling an allocation of processing resources for each of the units when a new call is received by said wireless base station,
wherein a spreading code and a transmission power required for installing said wireless base station are automatically set by operating the common downlink channel reception unit at the start-up of the wireless base station device, and
wherein the spreading code is determined based on scramble codes of neighboring cell information including a list of scramble codes used by neighbor base stations, said neighboring cell information being notified from each of said other base stations and being acquired from the downlink signal received by said common downlink channel reception unit.

2. A wireless base station, comprising:
a wireless unit for performing wireless communications with a mobile station and other wireless base stations;
a reception memory unit for storing therein reception spectrum spread data per sample as reception data, wherein the reception spectrum spread data is received by the wireless unit and sequentially sampled;
a baseband reception unit for processing and decoding the reception data accumulated in the reception memory unit;
a common downlink channel reception unit, activated at a start-up of said wireless base station, for receiving a downlink signal of one or more said other base stations by using the reception data stored in the reception memory unit;
a frame protocol processing unit including an interface for communicating with a wired transmission line for an upper-level device, for performing a frame protocol processing for the interface to convert a transmission channel format with respect to an uplink signal received by the baseband reception unit and a downlink signal transmitted from the upper-level device;
a baseband transmission unit for encoding downlink data outputted from the frame protocol processing unit, and digitally modulating to output encoded data;
a spread processing unit for spread-modulating the encoded data outputted from the baseband transmission unit to output spread-modulated data to the wireless unit; and
a call controller for controlling an allocation of processing resources for each of the units when a new call is received by said wireless base station,
wherein, at a start-up of said wireless base station, at least a part of a baseband signal processing is converted into a reception process for receiving the downlink signal from said other base stations, and said other base stations are searched, so that, if an effective cell detected, a transmission frequency of the wireless unit is set to be identical to a frequency of the effective cell, and a spreading code used for the spread processing unit is set to be different from that of the effective cell based on each of neighboring cell information including a list of scramble codes used by neighbor base stations, said neighboring cell information being notified from said other base stations and being acquired from the downlink signal received by said common downlink channel reception unit.

3. The wireless base station of claim 1, wherein, by providing a wired interface function for a control signal of a modularized terminal device for communicating with the wireless base station and setting a communications protocol control to the terminal device, the downlink signal of said other base stations is received by using the modularized terminal device to acquire installation conditions of said other base stations or propagation conditions of radio waves according to a wireless access method that are required when installing the wireless base station, so that the notification information and the signal levels of said other base stations are detected to automatically set the spreading code and the transmission power required for installing the wireless base station.

4. A wireless base station device, comprising:
a wireless unit for performing wireless communications with a mobile station and other wireless base station devices;
a reception memory unit for storing therein reception spectrum spread data per sample as reception data, wherein the reception spectrum spread data is received by the wireless unit and sequentially sampled;
a baseband reception unit for processing and decoding the reception data accumulated in the reception memory unit;
a frame protocol processing unit including an interface for communicating with a wired transmission line for an upper-level device, for performing a frame protocol processing for the interface to convert a transmission channel format with respect to an uplink signal received by the baseband reception unit and a downlink signal transmitted from the upper-level device;
a baseband transmission unit for encoding downlink data outputted from the frame protocol processing unit, and digitally modulating to output encoded data;
a spread processing unit for spread-modulating the encoded data outputted from the baseband transmission unit to output spread-modulated data to the wireless unit; and
a call controller for controlling an allocation of processing resources for each of the units when a new call is received by the wireless base station device;
wherein, at a start-up of the wireless base station device, at least a part of a baseband signal processing is converted into a reception process for receiving a downlink signal from other base station devices, and other base station devices are searched, so that, if an effective cell detected, a transmission frequency of the wireless unit is set to be identical to a frequency of the effective cell,
wherein a spreading code used for the spread processing unit is set to be different from that of the effective cell based on scramble codes included in notification information of the effective cell,
wherein a transmission power of the wireless base station device is determined based on signal levels of the other base station devices measured at the wireless base station device, and
wherein the transmission power is determined higher than the signal levels of the other base station devices measured at the wireless base station device.

5. The wireless base station of claim 1, the transmission power is determined higher than the signal levels of said other base stations measured at the wireless base station.

6. The wireless base station of claim 5, the transmission power is set by adding a predetermined default level to an offset value determined according to the signal levels of said other base stations measured at the wireless base station.

7. The wireless base station device of claim 4, the transmission power is set by adding a predetermined default level to an offset value determined according to the signal levels of the other base station devices measured at the wireless base station device.

8. The wireless base station device of claim 7, the spreading code used for the spread processing unit is set to be different from that of the effective cell based on scramble codes included in notification information of the effective cell.

9. The wireless base station of claim 1, wherein the spreading code and the transmission power are set to predetermined values, when said neighboring cell information is not acquirable from said other base stations.

10. The wireless base station of claim 2, wherein the spreading code and the transmission power are set to predetermined values, when said neighboring cell information is not acquirable from said other base stations.

* * * * *